(12) United States Patent
Joshi et al.

(10) Patent No.: US 9,756,360 B2
(45) Date of Patent: Sep. 5, 2017

(54) COEFFICIENT SCANNING IN VIDEO CODING

(75) Inventors: Rajan Laxman Joshi, San Diego, CA (US); Joel Sole Rojals, La Jolla, CA (US); Marta Karczewicz, San Diego, CA (US); Yunfei Zheng, Cupertino, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 867 days.

(21) Appl. No.: 13/551,458

(22) Filed: Jul. 17, 2012

(65) Prior Publication Data

US 2013/0051475 A1 Feb. 28, 2013

Related U.S. Application Data

(60) Provisional application No. 61/509,522, filed on Jul. 19, 2011, provisional application No. 61/509,926, (Continued)

(51) Int. Cl.
*H04B 1/66* (2006.01)
*H04N 7/12* (2006.01)
(Continued)

(52) U.S. Cl.
CPC ......... *H04N 19/625* (2014.11); *H04N 19/129* (2014.11); *H04N 19/147* (2014.11); (Continued)

(58) Field of Classification Search
CPC .................................................. H04N 19/129
See application file for complete search history.

(56) References Cited

U.S. PATENT DOCUMENTS

| 4,821,119 A | 4/1989 | Gharavi |
| 5,701,368 A | 12/1997 | Jung |

(Continued)

FOREIGN PATENT DOCUMENTS

| CN | 101155302 A | 4/2008 |
| EP | 1843595 A2 | 10/2007 |

(Continued)

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

(Continued)

*Primary Examiner* — Joseph Ustaris
*Assistant Examiner* — Rebecca Volentine

(57) ABSTRACT

In an example, aspects of this disclosure relate to a method for decoding transform coefficients in a video decoding process that includes decoding a one-dimensional array of transform coefficients, and performing a scan on the one-dimensional array of transform coefficients according to a sub-block scan order and a coefficient scan order to produce a block of transform coefficients, where the sub-block scan order comprises an order in which each sub-block of a plurality of sub-blocks within the block is scanned, and where the coefficient scan order comprises an order in which the transform coefficients corresponding to each sub-block of the plurality of sub-blocks are scanned.

54 Claims, 20 Drawing Sheets

Related U.S. Application Data filed on Jul. 20, 2011, provisional application No. 61/550,829, filed on Oct. 24, 2011, provisional application No. 61/554,292, filed on Nov. 1, 2011.

(51) Int. Cl.

| | |
|---|---|
| *H04N 11/02* | (2006.01) |
| *H04N 11/04* | (2006.01) |
| *H04N 19/625* | (2014.01) |
| *H04N 19/159* | (2014.01) |
| *H04N 19/176* | (2014.01) |
| *H04N 19/147* | (2014.01) |
| *H04N 19/129* | (2014.01) |
| *H04N 19/61* | (2014.01) |
| *H04N 19/436* | (2014.01) |

(52) U.S. Cl.
CPC ......... *H04N 19/159* (2014.11); *H04N 19/176* (2014.11); *H04N 19/436* (2014.11); *H04N 19/61* (2014.11)

(56) References Cited

U.S. PATENT DOCUMENTS

| | | | |
|---|---|---|---|
| 6,870,963 | B2 | 3/2005 | Govindaswamy et al. |
| 7,710,296 | B2 | 5/2010 | Sze et al. |
| 8,179,974 | B2* | 5/2012 | Tu et al. .................. 375/240.24 |
| 8,311,119 | B2* | 11/2012 | Srinivasan ............... 375/240.18 |
| 8,446,301 | B2* | 5/2013 | He et al. ........................ 341/107 |
| 8,634,479 | B2 | 1/2014 | Park et al. |
| 2003/0128886 | A1 | 7/2003 | Said |
| 2003/0156648 | A1* | 8/2003 | Holcomb et al. ........ 375/240.18 |
| 2005/0078754 | A1* | 4/2005 | Liang et al. ............. 375/240.18 |
| 2006/0014693 | A1 | 1/2006 | Facchiano et al. |
| 2008/0253461 | A1 | 10/2008 | Lin et al. |
| 2008/0310504 | A1 | 12/2008 | Ye et al. |
| 2009/0122864 | A1* | 5/2009 | Palfner et al. ........... 375/240.12 |
| 2009/0226103 | A1 | 9/2009 | Choi et al. |
| 2009/0257489 | A1 | 10/2009 | Karczewicz et al. |
| 2010/0097248 | A1 | 4/2010 | Sze et al. |
| 2010/0246687 | A1* | 9/2010 | Yoshimatsu ......... H04N 19/159 375/240.25 |
| 2011/0096834 | A1* | 4/2011 | Cheon .................. H04N 19/119 375/240.12 |
| 2011/0243220 | A1* | 10/2011 | Seregin ................ H04N 19/176 375/240.02 |
| 2011/0249755 | A1* | 10/2011 | Shibahara ............ H04N 19/129 375/240.18 |
| 2012/0051488 | A1 | 3/2012 | Eckardt et al. |
| 2012/0082233 | A1* | 4/2012 | Sze ........................ H04N 19/13 375/240.18 |
| 2012/0207222 | A1* | 8/2012 | Lou et al. ................ 375/240.18 |
| 2013/0003857 | A1* | 1/2013 | Yu ........................ H04N 19/176 375/240.18 |
| 2013/0058418 | A1* | 3/2013 | Lu ........................ H03M 7/4006 375/240.18 |
| 2013/0114731 | A1* | 5/2013 | Lee ...................... H04N 19/176 375/240.18 |
| 2013/0301705 | A1* | 11/2013 | Seregin ................ H04N 19/129 375/240.02 |
| 2013/0343454 | A1* | 12/2013 | Yeo .................... H04N 19/00763 375/240.03 |

FOREIGN PATENT DOCUMENTS

| | | |
|---|---|---|
| EP | 2216998 A1 | 8/2010 |
| RU | 2404534 C2 | 11/2010 |
| TW | 200838319 A | 9/2008 |
| TW | 200948094 A | 11/2009 |
| WO | 02104039 A1 | 12/2002 |
| WO | 2011128303 A2 | 10/2011 |
| WO | 2011142817 A1 | 11/2011 |

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Itu-T H.265, Series H: Audiovisual and Multimedia Systems, Infrastructure of audiovisual services—Coding of moving video, High efficiency video coding, The International Telecommunication Union, Apr. 2013, 317 pp.

Second Written Opinion from International Application No. PCT/US2012/047220, dated Jul. 25, 2013, 6 pp.

International Preliminary Report on Patentability—PCT/US2012/047220, The International Bureau of WIPO—Geneva, Switzerland, Oct. 21, 2013, 8 pp.

Response to Written Opinion dated Nov. 7, 2012, from International Application No. PCT/US2012/047220, filed on May 17, 2013, 43 pp.

Response to Second Written Opinion dated Jul. 25, 2013, from International Application No. PCT/US2012/047220, filed on Sep. 25, 2013, 8 pp.

Australian Examination Report from counterpart Australian Patent Application No. 2012284103, Feb. 13, 2015, 3 pp.

Ukraine Office Action from counterpart Ukraine Application No. a 2014 01625, dated Feb. 17, 2015, 6 pp.

Wiegand et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.

Auyeung et al., "CE11: Hardware complexity of large zig-zag scan for level-coding of transform coefficients", JCTVC-F597, Joint Collaborative Team on Video Coding (JCT-VC) of ITU-T SG16 WP3 and ISO/IEC JTC1/SC29/WG11, 6th Meeting: Torino (Italy), Jul. 2011.

Bross et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, 259 pp.

Bross et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d21, 290 pp.

Bross et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, 261 pp.

Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

Bross et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pp.

International Search Report and Written Opinion—PCT/US2012/047220—ISA/EPO—Nov. 7, 2012 13 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Sole et al., "CE11: Unified scans for the significance map and coefficient level coding in high efficiency", JCTVC-F288, Joint Collaborative Team on Video Coding (JCT-VC) of ITU-T SG16 WP3 and ISO/IEC JTC1/SC29/WG11, 6th Meeting: Torino (Italy), Jul. 2011.

Sole et al., "Parallel Context Processing for the significance map in high coding efficiency" , 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11 and ITU-T SG. 16);

(56) References Cited

OTHER PUBLICATIONS

URL: HTTP://WFTP3.ITU.INT/AV-ARCH/JCTVC-SITE/, No. JCTVC-D262, Jan. 16, 2011 (Jan. 16, 2011), XP030008302, ISSN: 0000-0013.
Sole et al., "Parallel processing of residual data in HE", 6. JCT-VC Meeting; 97. MPEG Meeting; Jul. 14, 2011-Jul. 22, 2011; Torino; (Joint Collaborative Team on Video Coding of ISO/IEC JTCI/SC29/WGII and ITU-T SG. 16) ; URL: HTTP://WFTP3.ITU.INT/AV-ARCH/JCTVC-SITE/, No. JCTVC-F552, Jul. 16, 2011 (Jul. 16, 2011), XP03000957.
Sole et al: "Unified scans for the significance map and coefficient level coding in high coding efficiency", 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11AND ITU-T SG. 16) ; URL:HTTP://WFTP3. ITU. INT/AV-ARCH/JC TVC-SITE/, No. JCTVC-E335, Mar. 11, 2011, XP030008841, ISSN: 0000-0005.
Sze, et al., "CE11: Parallelization of HHI_Transform_Coding (Fixed Diagonal Scan)", JCTVC-F129, Joint Collaborative Team on Video Coding (JCT-VC) of ITU-T SG16 WP3 and ISO/IEC JTC1/SC29/WG11, 6th Meeting: Torino (Italy), Jul. 2011.
U.S. Appl. No. 13/534,306, by Joel Sole Rojals, filed Jun. 27, 2012.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012].
Winken, et al., "Video Coding Technology Proposal by Fraunhofer HHI", Powerpoint, Fraunhofer Institute for Telecommunications, Heinrich Hertz Institute, Apr. 24, 2010.
Yang et al., "Coefficient rate and significance maps", Thirty-First Asilomar Conference on Signals, Systems and Computers, IEEE Computers Society, Nov. 2-5, 1997, vol. 2, 1998, pp. 1373-1377.
Yu et al., "Adaptive Scan for Large Blocks for HEVC", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG. 16 ); No. JCTVC-F569, Jul. 16, 2011 (Jul. 16, 2011), XP030009592, URL: HTTP://WFTP3.ITU.INT/AV-ARCH/JCTVC-SITE/.
Marpe et al., "Context-Based Adaptive Binary Arithmetic Coding in the H.264/AVC Video Compression Standard", IEEE Transactions on Circuits and Systems for Video Technology, Jul. 1, 2003, pp. 620-636, vol. 13, No. 7, IEEE Service Center, XP011099255, ISSN: 1051-8215, DOI: 10.1109/TCSVT.2003.815173.
Davies, "Unified scan processing for high efficiency coefficient coding", Joint Collaborative Team on Video Coding (JCT-VC)of ITU-T SG16 WP3 and ISO/IEC JTC1/SC29/WG11 JCTVC-D219, Jan. 2011, 7 pp.
Yu, et al, "Adaptive Scan for Large Blocks for HEVC", Joint Collaborative Team on Video Coding (JCT-VC) of ITU-T SG16 WP3 and ISO/IEC JTC1/SC29/WG11 JCTVC-F569_r2, Jul. 16, 2011, 6 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Office Action from counterpart Japanese Application No. 2014-521736, dated Mar. 10, 2015, 7 pp.
Office Action from counterpart Taiwan Applicaiton No. 101125930, dated Feb. 10, 2015, 18 pp.
Russian Office Action from corresponding Russian Application Serial No. 2014106068 dated Jun. 22, 2015 (10 pages).
Notice of Grounds from counterpart Korean Application No. 2014-7004034, dated May 21, 2015, 13 pp.
Office Action from counterpart Canadian Application No. 2,841,957, dated Jul. 27, 2015, 6 pp.
Decision on Grant from corresponding Ukranian Application No. a 2014 01625 dated Sep. 23, 2015 (30 pages).
Canadian Amendment filed in corresponding Canadian Application Serial No. 2,841,957 filed on Jan. 26, 2016 (99 pages).
Korean Final Rejection from corresponding Korean Application Serial No. 2014-7004034 dated Jan. 26, 2016 (6 pages).
Decision of Rejection from corresponding Japanese Application Serial No. 2014-521736 dated Feb. 2, 2016 (8 pages).
Notice of Acceptance from corresponding Australian Application Serial No. 201284103 dated Feb. 26, 2016 (3 pages).
Office Action from counterpart Canadian Application No. 2,841,957, dated Jun. 9, 2016, 6 pp.
Notice of Grounds for Rejection from counterpart Korean Application No. 2016-7011046, dated Jul. 18, 2016, 9 pp.
Decision on Grant from counterpart Russian Application No. 2014106068, dated Jul. 12, 2016, 31 pp.
Office Action from counterpart Philippines Application No. 1-2014-500123, dated Jun. 10, 2016, 3 pp.
Winken, et al., "Description of Video coding technology proposal by Fraunhofer HHI," JCTVC-A116 Meeting; Apr. 15-23, 2010; Dresden; (Joint Collaborative Team on Video Coding of ISO/IEC JTC1/SC29/WG11 and ITU-TSG. 16) ; URL: http://WFTP3. ITU. INT/AV-ARCH/JCTVC-SITE/, no., Apr. 24, 2010, 44 pp., XP030007557.

\* cited by examiner

COEFFICIENT SCANNING IN VIDEO CODING

This application claims priority to U.S. Provisional Application No. 61/509,522, filed 19 Jul. 2011, U.S. Provisional Application No. 61/509,926, filed 20 Jul. 2011, U.S. Provisional Application No. 61/550,829, filed 24 Oct. 2011, and U.S. Provisional Application No. 61/554,292, filed 1 Nov. 2011 the entire contents of each of which are incorporated herein by reference.

TECHNICAL FIELD

This disclosure relates to video coding, and more particularly to techniques for scanning and coding transform coefficients generated by video coding processes.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video picture or slice may be partitioned into blocks. Each block can be further partitioned. Blocks in an intra-coded (I) frame or slice are encoded using spatial prediction with respect to reference samples in neighboring blocks in the same picture or slice. Blocks in an inter-coded (P or B) frame or slice may use spatial prediction with respect to reference samples in neighboring blocks in the same picture or slice or temporal prediction with respect to reference samples in other reference pictures. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes devices and methods for coding transform coefficients associated with a block of residual video data in a video coding process. During coding, a block of transform coefficients may be divided into sub-sets, which may take the form of a plurality of sub-blocks. The sub-blocks may then be scanned and coded. For example, with respect to a video encoder, a two-dimensional array of transform coefficients from the sub-blocks may be scanned to form a one-dimensional array of transform coefficients, which are then encoded. With respect to a video decoder, a one-dimensional array of transform coefficients may be received and decoded, and then used to reconstruct the two-dimensional sub-blocks.

The techniques of this disclosure generally relate to scanning and coding sub-blocks of transform coefficients. For example, as described herein, a coefficient scan order may describe the order in which transform coefficients are scanned and coded within sub-blocks of a block of residual data. A sub-block scan order may describe the order in which the sub-blocks themselves are scanned and coded. According to aspects of this disclosure, the coefficient scan order may have the same orientation as the sub-block scan order, i.e., the order in which sub-blocks are scanned, to then scan coefficients within each sub-block, within the block of residual data. That is, according to aspects of this disclosure, the scan pattern/direction/order of the sub-block scan order may match that of the coefficient scan order within each sub-block. Additionally or alternatively, the techniques of this disclosure include adaptively determining the coefficient scan order and/or sub-block scan order based on a variety of criteria. Thus, in some examples, a coefficient scan order may be different than a sub-block scan order.

In an example, aspects of this disclosure relate to a method decoding transform coefficients in a video decoding process comprising decoding a one-dimensional array of transform coefficients; and performing a scan on the one-dimensional array of transform coefficients according to a sub-block scan order and a coefficient scan order to produce a block of transform coefficients, wherein the sub-block scan order comprises an order in which each sub-block of a plurality of sub-blocks within the block is scanned, and wherein the coefficient scan order comprises an order in which the transform coefficients corresponding to each sub-block of the plurality of sub-blocks are scanned.

In another example, aspects of this disclosure relate to an apparatus for decoding transform coefficients in a video decoding process, the apparatus comprising one or more processors configured to decode a one-dimensional array of transform coefficients; and perform a scan on the one-dimensional array of transform coefficients according to a sub-block scan order and a coefficient scan order to produce a block of transform coefficients, wherein the sub-block scan order comprises an order in which each sub-block of a plurality of sub-blocks within the block is scanned, and wherein the coefficient scan order comprises an order in which the transform coefficients corresponding to each sub-block of the plurality of sub-blocks are scanned.

In another example, aspects of this disclosure relate to an apparatus for decoding transform coefficients in a video decoding process, the apparatus comprising means for decoding a one-dimensional array of transform coefficients; and means for performing a scan on the one-dimensional array of transform coefficients according to a sub-block scan order and a coefficient scan order to produce a block of transform coefficients, wherein the sub-block scan order comprises an order in which each sub-block of a plurality of sub-blocks within the block is scanned, and wherein the coefficient scan order comprises an order in which the transform coefficients corresponding to each sub-block of the plurality of sub-blocks are scanned.

In another example, aspects of this disclosure relate to a computer-readable storage medium having instructions stored thereon that, when executed, cause one or more processors to decode a one-dimensional array of transform coefficients; and perform a scan on the one-dimensional array of transform coefficients according to a sub-block scan order and a coefficient scan order to produce a block of transform coefficients, wherein the sub-block scan order comprises an order in which each sub-block of a plurality of sub-blocks within the block is scanned, and wherein the coefficient scan order comprises an order in which the transform coefficients corresponding to each sub-block of the plurality of sub-blocks are scanned.

In another example, aspects of this disclosure relate to a method for encoding transform coefficients in a video encoding process comprising dividing a block of transform coefficients into a plurality of sub-blocks; performing a scan on the block of transform coefficients according to a sub-block scan order and a coefficient scan order to produce a one-dimensional array of transform coefficients, wherein the sub-block scan order comprises an order in which each of the plurality of sub-blocks is scanned, and wherein the coefficient scan order comprises an order in which the transform coefficients within each of the plurality of sub-blocks are scanned; and encoding the one-dimensional array of transform coefficients.

In another example, aspects of this disclosure relate to an apparatus for encoding transform coefficients in an encoding process, the apparatus comprising one or more processors configured to divide a block of transform coefficients into a plurality of sub-blocks; perform a scan on the block of transform coefficients according to a sub-block scan order and a coefficient scan order to produce a one-dimensional array of transform coefficients, wherein the sub-block scan order comprises an order in which each of the plurality of sub-blocks is scanned, and wherein the coefficient scan order comprises an order in which the transform coefficients within each of the plurality of sub-blocks are scanned; and encode the one-dimensional array of transform coefficients.

In another example, aspects of this disclosure relate to an apparatus for encoding transform coefficients in a video encoding process, the apparatus comprising means for dividing a block of transform coefficients into a plurality of sub-blocks; means for performing a scan on the block of transform coefficients according to a sub-block scan order and a coefficient scan order to produce a one-dimensional array of transform coefficients, wherein the sub-block scan order comprises an order in which each of the plurality of sub-blocks is scanned, and wherein the coefficient scan order comprises an order in which the transform coefficients within each of the plurality of sub-blocks are scanned; and means for encoding the one-dimensional array of transform coefficients.

In another example, aspects of this disclosure relate to a computer-readable storage medium having instructions stored thereon that, when executed, cause one or more processors to divide a block of transform coefficients into a plurality of sub-blocks; perform a scan on the block of transform coefficients according to a sub-block scan order and a coefficient scan order to produce a one-dimensional array of transform coefficients, wherein the sub-block scan order comprises an order in which each of the plurality of sub-blocks is scanned, and wherein the coefficient scan order comprises an order in which the transform coefficients within each of the plurality of sub-blocks are scanned; and encode the one-dimensional array of transform coefficients.

The details of one or more examples are set forth in the accompanying drawings and the description below. Other features, objects, and advantages will be apparent from the description and drawings, and from the claims.

DETAILED DESCRIPTION

Figure 1:
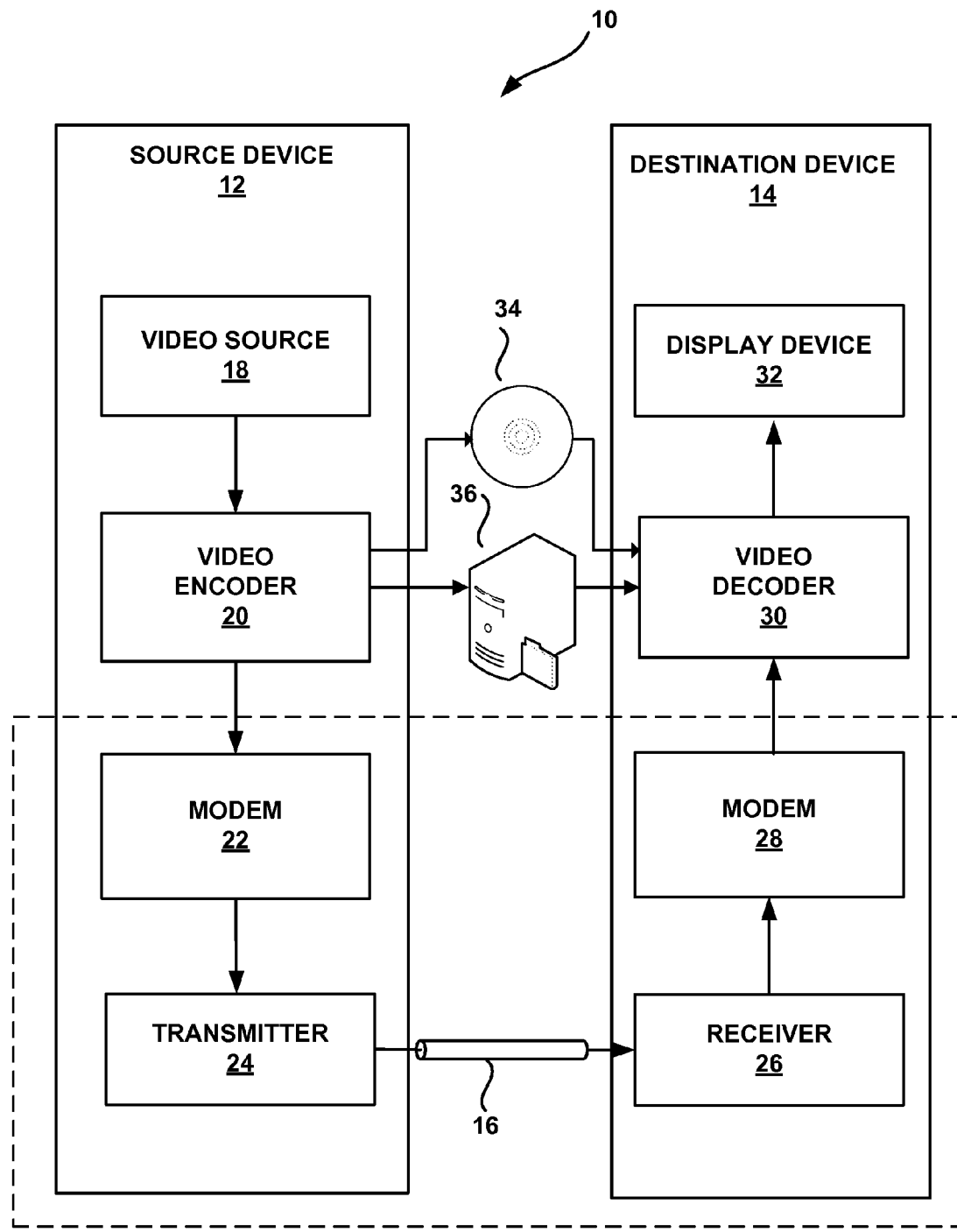
FIG. 1 is a block diagram illustrating an example video coding system that may be configured to perform the techniques of this disclosure.

A video coding device may compress video data by taking advantage of spatial and temporal redundancy. For example, a video encoder may take advantage of spatial redundancy by coding a block of video data relative to neighboring, previously coded blocks. Likewise, a video encoder may take advantage of temporal redundancy by coding a block of video data relative to video data of previously coded pictures, also referred to as pictures. In particular, the video encoder may predict a current block from data of a spatial neighbor or from data of a previously coded picture. The video encoder may then calculate a residual for the block as a difference between the actual pixel values for the block and the predicted pixel values for the block. That is, the residual for a block may include pixel-by-pixel difference values in the pixel (or spatial) domain.

Accordingly, to code a block (e.g., a prediction unit of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same picture (or slice), and other prediction units may be uni-directionally inter-coded (P) or bi-directionally inter-coded (B) with respect to reference blocks of reference samples in other previously-coded pictures (or slices). The reference samples may include actual pixels in the reference blocks and/or synthesized reference samples produced, e.g., by interpolation. In each case, the reference samples may be used to form a predictive block for a block to be coded.

To further compress the residual value of a block, the video encoder may transform the residual values into a set of transform coefficients that compact as much data (also referred to as "energy") as possible into as few coefficients as possible. The transform converts the residual values from pixel levels, e.g., luma and/or chroma levels, in the spatial domain to transform coefficients in a transform domain, e.g., using a discrete cosine transform (DCT), an integer transform, a Karhunen-Loeve (K-L) transform, or another transform. The transform coefficients correspond to a two-dimensional matrix of transform coefficients that is ordinarily the same size as the original block. In other words, there are typically just as many transform coefficients as pixels in the original block. However, due to the transform, many of the transform coefficients may have values equal to zero.

The video encoder may then quantize the transform coefficients to further compress the video data. Quantization generally involves mapping values within a relatively large range to values in a relatively small range, thus reducing the amount of data needed to represent the quantized transform coefficients. The video encoder may quantize the transform coefficients by applying a quantization parameter (QP) according to a predefined algorithm. After quantization, some of the transform coefficients may have values of zero. In addition, in certain video coding modes such as transform skip mode, the transform may be absent and quantization may be applied to the prediction residual directly.

An entropy coder then applies entropy coding, such as Context Adaptive Variable Length Coding (CAVLC), Context Adaptive Binary Arithmetic Coding (CABAC), Probability Interval Partitioning Entropy Coding (PIPE), or the like, to the quantized transform coefficients. To entropy code a block of quantized transform coefficients, a scanning process is usually performed so that the two-dimensional (2D) array of quantized transform coefficients in a block is rearranged, according to a particular scan order, into an ordered, one-dimensional (1D) array, i.e., vector, of transform coefficients. Entropy coding is applied to the vector of transform coefficients. The scan of the quantized transform coefficients serializes the 2D array of transform coefficients for the entropy coder.

According to some examples, the positions of the significant coefficients (i.e., nonzero transform coefficients) in a video block may be encoded prior to the values of the transform coefficients, which may be referred to as the "levels" of the transform coefficients. The process of coding the locations of the significant coefficients may be referred to as significance map coding. A significance map includes a two-dimensional array of binary values that indicate locations of significant coefficients.

For example, a significance map for a block of video data may include a 2D array of ones and zeros, in which the ones indicate positions of significant transform coefficients within the block and the zeros indicate positions of non-significant (zero-valued) transform coefficients within the block. The ones and zeros may be referred to as "significant coefficient flags." Additionally, in some examples, the significance map may include another 2D array of ones and zeros, in which a one indicates a position of a last significant coefficient within the block according to a scanning order associated with the block, and the zeros indicate positions of all other coefficients within the block. In this case, the ones and zeros are referred to as "last significant coefficient flags." In other examples, such last significant coefficient flags are not used. Rather, the last significant coefficient in a block may be coded first, before sending the rest of the significance map. In any case, significance map coding for a block of video data may consume a significant percentage of the video bitrate used to code the block.

After the significance map is scanned coded, a video coder may scan and code the level of each transform coefficient. For example, a video coder may convert an absolute value, i.e., level, of each non-zero transform coefficient into binary form. In this way, the level of each non-zero transform coefficient may be "binarized," e.g., using a unary or other code to generate one or more bits, or "bins," to represent the transform coefficient. In addition, a number of other binarized syntax elements may be included to allow a video decoder to decode the video data.

In some examples, the scan order of a significance map may be different than that of the coefficient levels. In other examples, the scan order of the transform coefficients may be harmonized, such that the scan of the coefficient levels is the same as the scan of a significance map, i.e., in scan direction and scan pattern. In addition, as noted above, scans for coefficient levels and significant coefficients may be performed backwards, i.e., as an inverse scan that proceeds from the last significant coefficient in the block to the first coefficient (the DC component) in the block. To facilitate the inverse scan, a video coder may identify the last significant coefficient prior to scanning Once the last significant coefficient in a block is identified, then a backward scan order can be applied for both the significance map and coefficient levels.

After scanning, a number of zero coefficients will typically be grouped at one end of the 1D array, depending on the scan direction, due to reduced energy at higher frequencies, and due to the effects of quantization, which may cause some nonzero coefficients to become zero-valued coefficients upon reduction of bit depth. These characteristics of coefficient distribution in the serialized 1D array may be utilized in entropy coder design to improve coding efficiency. In other words, if non-zero coefficients can be effectively arranged in one portion of the 1D array through some appropriate scan order, better coding efficiency can be expected due to the design of many entropy coders. For example, entropy coding may code runs of zero-valued coefficients, providing more efficient symbols for coding.

As an example, when a DCT is applied to transform coefficients, there is often a higher probability of non-zero coefficients toward an upper left corner (i.e., a low frequency region) of the 2D transform unit. Accordingly, entropy coding efficiency may be increased if the transform coefficients are scanned beginning in the upper left corner, which may increase the probability of grouping non-zero coefficients together at the relative beginning of the serialized run of coefficients. In addition, the zero-valued coefficients may be grouped together toward that end of the serialized array, which may increase entropy coding efficiency.

A diagonal (or wavefront) scan order has been adopted for use in scanning quantized transform coefficients in the proposed HEVC standard. Through transform and quantization, as mentioned above, non-zero transform coefficients may be located at the low frequency area toward the upper left region of the block for an example in which the transform is a DCT. As a result, after the diagonal scanning process, which may traverse the upper left region first, non-zero transform coefficients may be more likely to be located in the front portion of the 1D array. For a diagonal scanning process that traverses from the lower right region first, the non-zero transform coefficients are usually more likely to be located in the back portion of the 1D array.

While the example above refers to a diagonal scan, to achieve the objective of placing more non-zero coefficients at one end of the 1D array, different scan orders may be used in a video coder (e.g., video encoder or video decoder) code transform coefficients. In some cases, diagonal scanning may be effective. In other cases, different types of scanning, such as zig-zag, vertical or horizontal scanning may be more effective. The particular scan that is implemented may depend on various criteria, such as a rate-distortion metric.

Different scan orders may be produced in a variety of ways. One example is that, for each block of transform coefficients, a "best" scan order may be chosen from a number of available scan orders. A video encoder then may provide an indication to the decoder, for each block, an index of the best scan order among a set of scan orders denoted by respective indices. The selection of the best scan order may be determined by applying several scan orders and selecting one that is most effective in placing nonzero coefficients near the beginning or end of the 1D vector, thereby promoting efficient entropy coding.

In another example, the scan order for a current block may be determined based on various factors relating to the coding of the pertinent prediction unit, such as the prediction mode (I, B, P), block size, transform or other factors. In some cases, because the same information, e.g., prediction mode, can be inferred at both the encoder and decoder side, there may be no need to provide an indication of the scan order index to the decoder. Instead, the video decoder may store configuration data that indicates the appropriate scan order given knowledge of the prediction mode for a block, and one or more criteria that maps a prediction mode to a particular scan order.

To further improve coding efficiency, the available scan orders may not be constant all of the time. Instead, some adaptation might be enabled so that the scan order is adaptively adjusted, e.g., based on coefficients that are already coded. In general, the scan order adaptation may be done in such a way that, according to the selected scan order, zero and non-zero coefficients are more likely to be grouped together.

In some video coders, the initial available scan orders may be in a very regular form such as purely horizontal, vertical, diagonal, or zig-zag scan. Alternatively, the scan orders may be derived through a training process and therefore may appear to be somewhat random. The training process may involve application of different scan orders to a block or series of blocks to identify a scan order that produces desirable results, e.g., in terms of efficient placement of nonzero and zero-valued coefficients, as mentioned above.

If a scan order is derived from a training process, or if a variety of different scan orders can be selected, the particular scan orders may be stored at both the encoder and decoder side. The amount of data specifying such scan orders may be relatively substantial. For example, for a 32×32 transform block, one scan order may contain 1024 transform coefficient positions. Because there may be differently sized blocks and, for each size of transform block, there may be a number of different scan orders, the total amount of data that needs to be saved is not negligible.

In contrast, regular scan orders such as diagonal, horizontal, vertical or zig-zag order may not require storage, or may require minimal storage. However, regular scans such as a forward horizontal or vertical scan will scan one row/column from left or top all the way to the right or bottom, then go back to the left or top for next row/column. This kind of "strong" orientation for the scanning order may not be efficient for large blocks, as there may be little correlation between the transform coefficients at the end of one row/column and the beginning of the next/row column.

In some examples, to improve efficiency and/or simplify implementation, a block of transform coefficients may be divided into sub-sets, which may take the form of a plurality of sub-blocks. For example, it may be burdensome (e.g., computationally inefficient) for a software or hardware video coder to implement a zigzag or diagonal scan for large blocks such as 32×32. Accordingly, after dividing a block into sub-blocks, the sub-blocks may then be scanned and coded. With respect to a video encoder, a two-dimensional array of transform coefficients from the sub-blocks may be scanned to form a one-dimensional array of transform coefficients, which are then encoded. With respect to a video decoder, a one-dimensional array of transform coefficients may be received and decoded, which are then used to reconstruct the two-dimensional sub-blocks.

The techniques of this disclosure generally relate to scanning and coding sub-blocks of transform coefficients. For example, as described herein, a coefficient scan order may describe the order in which transform coefficients are scanned and coded within sub-blocks. A sub-block scan order may describe the order in which the sub-blocks themselves are scanned and coded. According to aspects of this disclosure, the coefficient scan order may have the same orientation as the sub-block scan order. For example, as described herein, a scan orientation may generally refer to the scan direction, pattern, or overall order of the scan. That is, a zig-zag pattern (e.g., as shown and described with respect to FIG. 5A) may be referred to as having a zig-zag orientation. In addition, a scan that is diagonal in direction (e.g., as shown and described with respect to FIG. 5D-5F) may be referred to as having a diagonal orientation. According to aspects of this disclosure, the orientation of the sub-block scan order may match that of the coefficient scan order.

For example, according to aspects of this disclosure, a video coder may sub-divide a block that is larger than a predetermined sub-block size into sub-blocks. In some examples, the video coder may divide a block into 4×4 sub-blocks, although a variety of other sub-block sizes (e.g., 2×2, 8×8, 16×16, and the like) may also be used. If the video coder uses the same sub-block size for all blocks of a picture (or slice), gains may be achieved in a hardware implementation due to the uniformity of the sub-block sizes. A uniform sub-block size is not necessary, however, to carry out the techniques of this disclosure.

After dividing the block of transform coefficients into sub-blocks, the video coder may scan transform coefficients of the sub-blocks in coefficient scanning order, as well as scan the sub-blocks themselves in sub-block scanning order. According to aspects of this disclosure, the coefficient scan order and the sub-block scan order may have the same orientation (e.g., the same scan pattern, direction, or order). That is, for example, the video coder may diagonally scan each of the transform coefficients (e.g., including significance, sign, level, and the like) of the sub-blocks in coefficient scan order. The video coder may also diagonally scan across the sub-blocks in sub-block scan order. To illustrate, the order in which the sub-blocks are scanned may specify that the coefficients within a sub-block are scanned first, then the coefficients within a second sub-block are scanned second, and so forth, whereas the order of coefficient scanning specifies the order in which coefficients within a given sub-block are scanned.

In other examples, according to aspects of this disclosure, a coefficient scan order may be different than a sub-block scan order. That is, for example, a video coder may perform a diagonal sub-block scan order and a zig-zag coefficient scan order. As described in greater detail below, the video coder may adaptively determine the sub-block and coefficient scan orders based on, e.g., a rate-distortion metric.

In some examples, the video coder may perform the scans in reverse. In addition, according to some aspects, the video coder may scan and code the sub-blocks sequentially. That is, the video coder may scan and code transform coefficients of a current sub-block in coefficient scan order before moving on to the next sub-block in sub-block scan order.

Aspects of this disclosure also relate to the use of a sub-block adaptive scanning order to perform scanning for entropy coding (e.g., a significance map scan or coefficient level scan in CABAC). In one example, the sub-block adaptive scanning order may be used in place of the strong horizontal and vertical scanning orders, as described above, for relatively large block sizes (e.g. 32×32 or 16×16 block sizes). However, the following techniques may be used for any size block that may be sub-divided. As noted above, adaptive scans may help to group non-zero transform coefficients of a block together.

In some examples, dividing a block of transform coefficients into sub-blocks may create a context dependency within the sub-blocks (e.g., when entropy coding using context). For example, when scanning within the sub-blocks using a diagonal scan, a context for a top left coefficient within a sub-block may depend on the previous coefficient being processed (e.g., the transform coefficient positioned below the current transform coefficient). The context dependency may impose an undesired delay when entropy coding. To avoid this dependency and thus enhance parallelization, aspects of this disclosure relate to modifying the positions from which context may be derived, which may be referred to as a context support neighborhood. For example, the techniques of this disclosure include determining a context support neighborhood that removes the dependency of two consecutive coefficients, allowing a video coder to process two bins in parallel. In some examples, the dependency removal can be increased from two to three, four or more consecutive coefficients. In those cases, the context support neighborhood at each position may be modified to remove context dependencies in the neighborhood given a particular scan order.

FIG. 1 is a block diagram illustrating an example video encoding and decoding system 10 that may be configured to utilize techniques for coding transform coefficients in accordance with examples of this disclosure. As shown in FIG. 1, system 10 includes a source device 12 that transmits encoded video to a destination device 14 via a communication channel 16. Encoded video may also be stored on a storage medium 34 or a file server 36 and may be accessed by the destination device 14 as desired. Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication.

Hence, communication channel 16 may comprise a wireless channel, a wired channel, or a combination of wireless and wired channels suitable for transmission of encoded video data, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Techniques for coding transform coefficients, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, a video encoder 20, a modulator/demodulator 22 and a transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video information may be modulated by modem 22 according to a communication standard, such as a wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by video encoder 20 may also be stored onto a storage medium 34 or a file server 36 for later consumption. Storage medium 34 may include Blu-ray discs, DVDs, CD-ROMs, flash memory, or any other suitable digital storage media for storing encoded video. The encoded video stored on storage medium 34 may then be accessed by destination device 14 for decoding and playback.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes a receiver 26, a modem 28, a video decoder 30, and a display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). The latest Working Draft (WD) of HEVC, and referred to as HEVC WD7 hereinafter, is available from http://phenix.int-evry.fr/jct/doc_end_user/documents/9_Geneva/wg11/JCTVC-I1003-v5.zip, with a more recent version available from http://phenix.int-evey.fr/jct/doc_end_user/documents/9_Geneva/wg11/JCTVC-I1003-v6.zip, both of which are hereby incorporated by reference as if set forth in their entirety herein. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263.

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

The HEVC standard refers to a block of video data as a coding unit (CU). In general, a CU has a similar purpose to a macroblock coded according to H.264, except that a CU does not have a size distinction. Thus, a CU may be split into sub-CUs. In general, references in this disclosure to a CU may refer to a largest coding unit (LCU) of a picture or a sub-CU of an LCU. For example, syntax data within a bitstream may define the LCU, which is a largest coding unit in terms of the number of pixels. An LCU may be split into sub-CUs, and each sub-CU may be split into sub-CUs. Syntax data for a bitstream may define a maximum number of times an LCU may be split, referred to as a maximum CU depth. Accordingly, a bitstream may also define a smallest coding unit (SCU).

An LCU may be associated with a hierarchical quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference picture to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, a video encoder may calculate a residual value for the portion of the CU corresponding to the PU. The residual value may be transformed, quantized, and scanned. A TU is not necessarily limited to the size of a PU. Thus, TUs may be larger or smaller than corresponding PUs for the same CU. In some examples, the maximum size of a TU may be the size of the corresponding CU. This disclosure also uses the term "block" to refer to any of a CU, PU, or TU.

Video encoder 20 may implement any or all of the techniques of this disclosure to improve encoding of transform coefficients in a video coding process. Likewise, video decoder 30 may implement any or all of these techniques to improve decoding of transform coefficients in a video coding process. A video coder, as described in this disclosure, may refer to a video encoder or a video decoder. Similarly, a video coding unit may refer to a video encoder or a video decoder. Likewise, video coding may refer to video encoding or video decoding.

According to aspects of this disclosure, video encoder 20 and/or video decoder 30 may process transform coefficients of a block (e.g., a TU) in a plurality of sub-blocks. The sub-blocks may be equally or differently sized. Video encoder 20 and/or video decoder 30 may scan transform coefficients of the sub-blocks in a coefficient scan order and may scan the sub-blocks themselves in a sub-block scan order. That is, the sub-block scan order may specify that the coefficients in a first sub-block are scanned first, the coefficients in a second sub-block are scanned second, the coefficients in a third sub-block are scanned third, and so forth. The coefficient scan order then may specify the order in which the coefficients within each sub-block are scanned. According to aspects of this disclosure, video encoder 20 and/or video decoder 30 may use the same orientation (e.g., scan pattern, direction, or order) for the coefficient scan order and the sub-block scan order. That is, according to aspects of this disclosure, the orientation of the sub-block scan order may match that of the coefficient scan order. In other examples, the sub-block scan order may differ from the coefficient scan order (e.g., in examples in which the sub-block scan order and coefficient scan order are adaptively determined).

For example, after dividing the block of transform coefficients into sub-blocks (or receiving sub-blocks of transform coefficients), video encoder 20 and/or video decoder 30 may scan transform coefficients of the sub-blocks in coefficient scanning order, as well as scan the sub-blocks themselves in sub-block scanning order. That is, for example, video encoder 20 and/or video decoder 30 may diagonally scan each of the transform coefficients of the sub-blocks in coefficient scan order. Video encoder 20 and/or video decoder 30 may also diagonally scan across the sub-blocks in sub-block scan order. In some examples, video encoder 20 and/or video decoder 30 may perform the scans in reverse. In addition, according to some aspects, video encoder 20 and/or video decoder 30 may scan and code the sub-blocks sequentially. That is, video encoder 20 and/or video decoder 30 may scan and code transform coefficients (e.g., including significance, sign, level, and the like) of a current sub-block in coefficient scan order before moving on to the next sub-block in sub-block scan order.

According to some aspects, video encoder 20 and/or video decoder 30 may perform an adaptive sub-block scanning order. In one example, the sub-block adaptive scanning order may be used in place of the strong horizontal and vertical scanning orders, as described above, for relatively large block sizes (e.g. 32×32 or 16×16 block sizes). Video encoder 20 and/or video decoder 30 may adaptively determine the sub-block scan order and the coefficient scan order for a block based on block size, prediction mode of the block (e.g., intra/inter prediction mode), neighboring block's information (prediction mode, motion information, scan index), and/or from a full rate-distortion decision at the encoder and syntax from the encoded bitstream at the decoder.

Although not shown in FIG. 1, in some aspects, video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Figure 2:
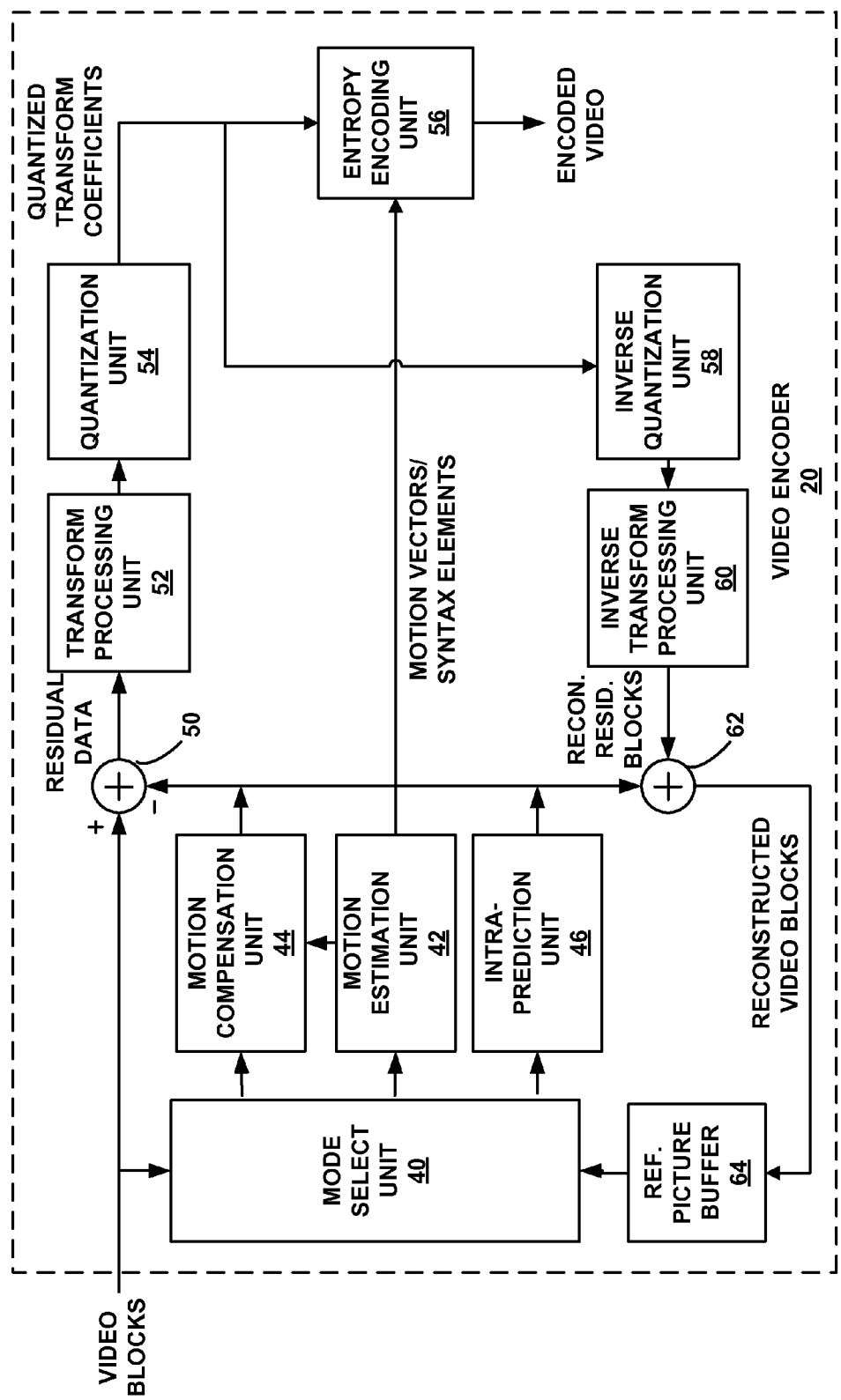
FIG. 2 is a block diagram illustrating an example video encoder that may be configured to perform the techniques of this disclosure.

FIG. 2 is a block diagram illustrating an example of a video encoder 20 that may use techniques for coding transform coefficients as described in this disclosure. While certain aspects of video encoder 20 may be described in FIG. 2 with respect to the proposed HEVC coding for purposes of illustration, it should be understood that the techniques of this disclosure may be performed without limitation as to other coding standards or methods that may require scanning of transform coefficients.

In the example of FIG. 2, video encoder 20 includes a motion compensation unit 44, a motion estimation unit 42, an intra-prediction unit 46, a reference picture buffer 64, a summer 50, a transform processing unit 52, a quantization unit 54, and an entropy encoding unit 56. Transform processing unit 52 illustrated in FIG. 2 is the unit that applies the actual transform to a block of residual data, and is not to be confused with block of transform coefficients, which may be referred to as a transform unit (TU) of a CU. For video block reconstruction, the video encoder 20 also includes an inverse quantization unit 58, an inverse transform processing unit 60, and a summer 62. A deblocking filter (not shown in FIG. 2) may also be included to filter block boundaries to remove blockiness artifacts from reconstructed video. If desired, the deblocking filter would typically filter the output of the summer 62.

During the encoding process, video encoder 20 receives a video picture or slice to be coded. The picture or slice may be divided into multiple video blocks, e.g., largest coding units (LCUs). Motion estimation unit 42 and motion compensation unit 44 perform inter-predictive coding of the received video block relative to one or more blocks in one or more reference pictures to provide temporal compression. Intra-prediction unit 46 may perform intra-predictive coding of the received video block relative to one or more neighboring blocks in the same picture or slice as the block to be coded to provide spatial compression.

Mode select unit 40 may select one of the coding modes, intra or inter, e.g., based on rate distortion analysis for each mode, and provides the resulting intra- or inter-coded block to summer 50 to generate residual block data and to summer 62 to reconstruct the encoded block for use in a reference picture. Some video pictures may be designated as I-frames, where all blocks in an I-frame are encoded in an intra-prediction mode. In some cases, intra-prediction unit 46 may perform intra-prediction encoding of a block in a P- or B-frame, e.g., when motion search performed by motion estimation unit 42 does not result in a sufficient prediction of the block.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a prediction unit in a current picture relative to a reference sample of a reference picture. A reference sample may be a block that is found to closely match the portion of the CU including the PU being coded in terms of pixel difference, which may be determined by sum of absolute difference (SAD), sum of square difference (SSD), or other difference metrics. Motion compensation, performed by motion compensation unit 44, may involve fetching or generating values for the prediction unit based on the motion vector determined by motion estimation. Again, motion estimation unit 42 and motion compensation unit 44 may be functionally integrated, in some examples.

Motion estimation unit 42 calculates a motion vector for a prediction unit of an inter-coded picture by comparing the prediction unit to reference samples of a reference picture stored in reference picture buffer 64. In some examples, video encoder 20 may calculate values for sub-integer pixel positions of reference pictures stored in reference picture buffer 64. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision. Motion estimation unit 42 sends the calculated motion vector to entropy encoding unit 56 and motion compensation unit 44. The portion of the reference picture identified by a motion vector may be referred to as a reference sample. The reference sample may define pixel values for use in forming predictive pixels values for the current block to be coded. Motion compensation unit 44 may calculate a prediction value for a prediction unit of a current CU, e.g., by retrieving the reference sample identified by a motion vector for the PU.

Intra-prediction unit 46 may intra-prediction encode the received block, as an alternative to inter-prediction performed by motion estimation unit 42 and motion compensation unit 44. Intra-prediction unit 46 may encode the received block relative to neighboring, previously coded blocks, e.g., blocks above, above and to the right, above and to the left, or to the left of the current block, assuming a left-to-right, top-to-bottom encoding order for blocks. Intra-prediction unit 46 may be configured with a variety of different intra-prediction modes. For example, intra-prediction unit 46 may be configured with a certain number of directional prediction modes, e.g., 33 directional prediction modes, based on the size of the CU being encoded.

Intra-prediction unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, intra-prediction unit 46 may calculate an error value for the prediction mode based on pixel differences between the PU and the received block to be encoded. Intra-prediction unit 46 may continue testing intra-prediction modes until an intra-prediction mode that yields an acceptable error value is discovered. Intra-prediction unit 46 may then send the PU to summer 50.

Video encoder 20 forms a residual block by subtracting the prediction data calculated by motion compensation unit 44 or intra-prediction unit 46 from the original video block being coded. Summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

Transform processing unit 52 may form one or more transform units (TUs) from the residual block. Transform processing unit 52 applies a transform, such as a discrete cosine transform (DCT), a directional transform, or a conceptually similar transform, to the TU, producing a video block comprising transform coefficients. Transform processing unit 52 may send the resulting transform coefficients to quantization unit 54. In certain video coding modes such as transform skip mode, transform processing unit 52 may send the residual block to quantization unit 54 directly, without performing transformation. In such instances, the residual values may still be referred to herein as "transform coefficients," despite no transform actually being applied to the residual values.

Quantization unit 54 may then quantize the transform coefficients. Entropy encoding unit 56 may then perform a scan of the quantized transform coefficients in the matrix according to a specified scan order. This disclosure describes entropy encoding unit 56 as performing the scan. However, it should be understood that, in other examples, other processing units, such as transform processing unit 52, quantization unit 54, or another unit if video encoder 20 may perform the scan.

According to aspects of this disclosure entropy encoding unit 56 may scan transform coefficients of a 2D TU using a plurality of sub-blocks. For example, entropy encoding unit 56 may scan transform coefficients of the sub-blocks in a coefficient scan order and may scan the sub-blocks themselves in a sub-block scan order. According to aspects of this disclosure, entropy encoding unit 56 may use the same orientation (e.g., scan pattern, direction, or order) for the coefficient scan order and the sub-block scan order. That is, according to aspects of this disclosure, the orientation of the sub-block scan order may match that of the coefficient scan order. In other examples, the sub-block scan order may differ from the coefficient scan order (e.g., in examples in which the sub-block scan order and coefficient scan order are adaptively determined).

For example, entropy encoding unit 56 may generate a TU of transform coefficients. Prior to scanning the TU to serialize the TU, entropy encoding unit 56 may divide the TU into a plurality of sub-blocks. Entropy encoding unit 56 may then scan transform coefficients of the sub-blocks in coefficient scanning order, as well as scan the sub-blocks themselves in sub-block scanning order. That is, in an example for purposes of illustration, entropy encoding unit 56 may diagonally scan each of the transform coefficients of the sub-blocks in coefficient scan order. Entropy encoding unit 56 may also diagonally scan across the sub-blocks (scan the sub-blocks themselves) in sub-block scan order. In some examples, entropy encoding unit 56 may perform the scans in reverse. In addition, according to some aspects, entropy encoding unit 56 may scan and code the sub-blocks sequentially. That is, entropy encoding unit 56 may scan and code all bins associated with transform coefficients of a current a sub-block in coefficient scan order before moving on to the next sub-block in sub-block scan order. In other examples, entropy encoding unit 56 may code a particular bin for the entire TU (including all sub-blocks) before coding the next bin.

According to some aspects, entropy encoding unit 56 may perform an adaptive sub-block scanning order. In one example, the sub-block adaptive scanning order may be used in place of the strong horizontal and vertical scanning orders, as described above, for relatively large block sizes (e.g. 32×32 or 16×16 block sizes). Entropy encoding unit 56 may adaptively determine the sub-block scan order and the coefficient scan order for a block based on block size, prediction mode of the block (e.g., intra/inter prediction mode), neighboring block's information (prediction mode, motion information, scan index), and/or from a full rate-distortion decision at the encoder and syntax from the encoded bitstream at the decoder.

Once the transform coefficients are scanned (or during the scan), entropy encoding unit 56 may apply entropy coding such as CAVLC, PIPE, or CABAC to the coefficients. In addition, entropy encoding unit 56 may encode motion vector (MV) information and any of a variety of other syntax elements useful in decoding the video data at the video decoder 30. The syntax elements may include a significance map with significant coefficient flags that indicate whether particular coefficients are significant (e.g., non-zero) and a last significant coefficient flag that indicates whether a particular coefficient is the last significant coefficient (in some examples, the last significant coefficient position may not be coded). Video decoder 30 may use these syntax elements to reconstruct the encoded video data. Following the entropy coding by entropy encoding unit 56, the resulting encoded video may be transmitted to another device, such as video decoder 30, or archived for later transmission or retrieval.

In some examples, dividing a block of transform coefficients into sub-blocks may create a context dependency within the sub-blocks (e.g., when entropy coding using context) information). For example, when scanning within the sub-blocks using a diagonal scan, a context for a particular bin (such as significance map bins) for a top left coefficient within a sub-block may depend on the previous coefficient being processed (e.g., the transform coefficient positioned below the current transform coefficient). The context dependency may impose an undesired delay when entropy coding. To avoid this dependency and thus enhance parallelization, entropy encoding unit 56 may modify the context support neighborhood. For example, entropy encoding unit 56 may determine a context support neighborhood that removes the context dependency of two consecutive coefficients, allowing entropy encoding unit 56 to encode two bins in parallel. That is, according to aspects of this disclosure, one or more positions from a set of positions (i.e., a context support neighborhood) that would ordinarily be used to derive context may be removed, thereby establishing a reduced context set. In some examples, entropy encoding unit 56 may increase the dependency removal from two to three, four or more consecutive coefficients. In those cases, the context support neighborhood at each position may be modified to remove context dependencies in the neighborhood given a particular scan order.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture buffer 64. The reconstructed video block may be used by motion estimation unit 42 and motion compensation unit 44 as a reference block to inter-code a block in a subsequent video picture.

Figure 3:
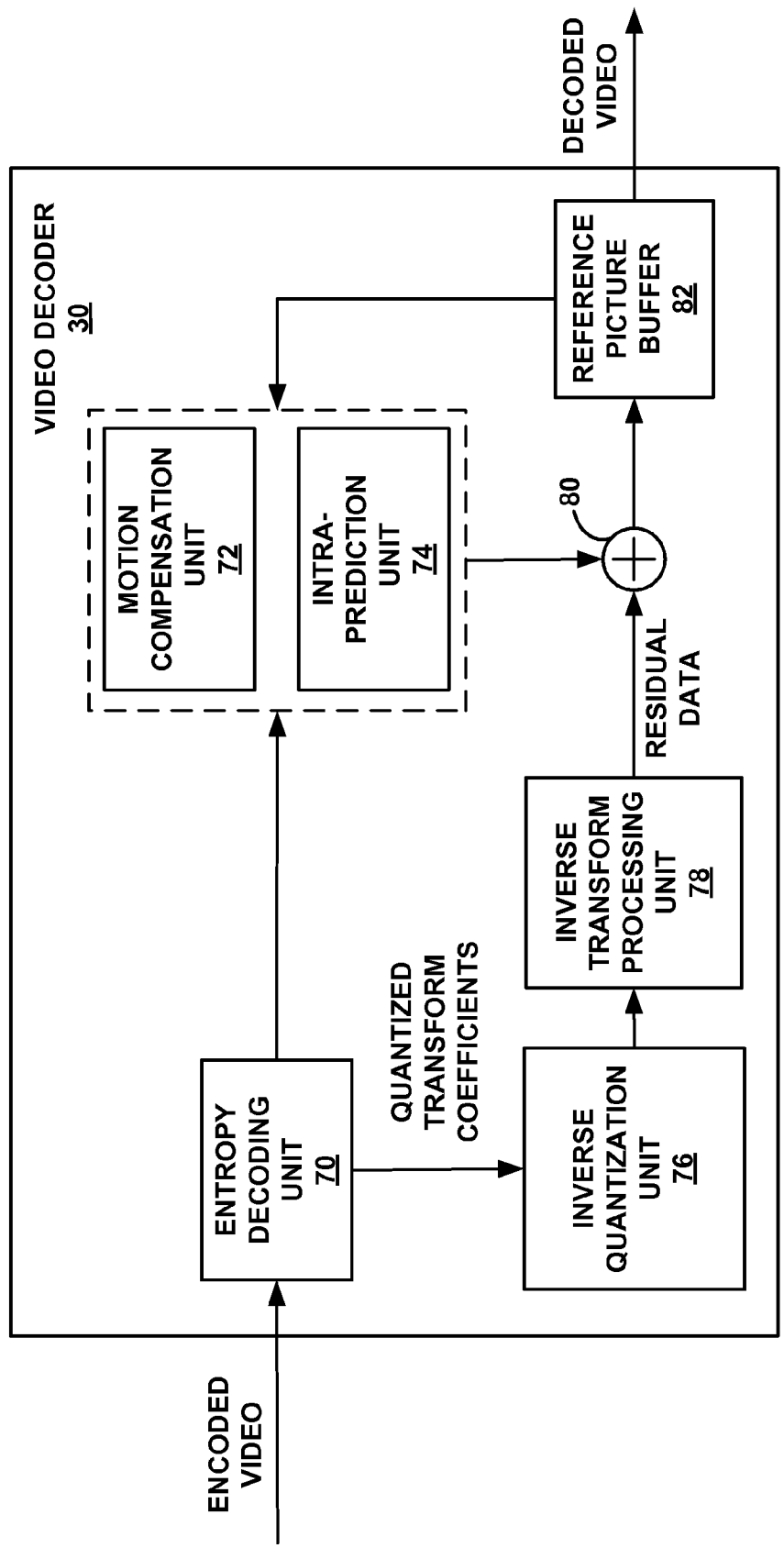
FIG. 3 is a block diagram illustrating an example video decoder that may be configured to perform the techniques of this disclosure.

FIG. 3 is a block diagram illustrating an example of a video decoder 30, which decodes an encoded video sequence. In the example of FIG. 3, video decoder 30 includes an entropy decoding unit 70, a motion compensation unit 72, an intra-prediction unit 74, an inverse quantization unit 76, an inverse transformation unit 78, a reference picture buffer 82 and a summer 80.

Entropy decoding 70 entropy decodes the encoded video in a process that may be the inverse of that used by entropy encoding unit 56 of FIG. 2. Motion compensation unit 72 may generate prediction data based on motion vectors received from entropy decoding unit 70. Intra-prediction unit 74 may generate prediction data for a current block of a current picture based on a signaled intra-prediction mode and data from previously decoded blocks of the current picture.

In some examples, entropy decoding unit 70 (or inverse quantization unit 76) may scan the received values using a scan matching the scan order used by entropy encoding unit 56 (or quantization unit 54) of video encoder 20. Although the scanning of coefficients may be performed in inverse quantization unit 76, scanning will be described for purposes of illustration as being performed by entropy decoding unit 70. In addition, although shown as separate functional units for ease of illustration, the structure and functionality of entropy decoding unit 70, inverse quantization unit 76, and other units of the video decoder 30 may be highly integrated with one another.

Video decoder 30 may receive, from encoded bitstream, signaling that identifies the scan order used by video encoder 20. Additionally, or alternatively, the scan order may be inferred by video decoder 30 based on characteristics of the coded video such as prediction mode, block size, transform, or other characteristics. As another example, video encoder 20 and video decoder 30 may use predetermined scan orders and contexts for all use cases, and as such, no signaling in the encoded bitstream would be needed.

In accordance with techniques of this disclosure, the scan order determined by the video decoder 30 may include a sub-block scan order and a coefficient scan order that define how transform coefficients from the 1D vector are scanned into a 2D block divided into a plurality of sub-blocks. The decoder may infer the number and/or size of the sub-blocks for the block of transform coefficients based on a size of the 2D block. In other examples, the number and/or size of the sub-blocks may be indicated in the encoded video bitstream.

No matter how the scan order is determined, entropy decoding unit 70 uses the inverse of the scan order used by the encoder to scan the 1D vector into the 2D array. In accordance with techniques of this disclosure, entropy decoding unit 70 may perform a scanning process that scans transform coefficients from sections of the 1D vector into a plurality of sub-blocks of the 2D block. This process may be the inverse of the process described above with reference to FIG. 2.

For example, according to aspects of this disclosure, entropy decoding unit 70 may decode and inverse scan a TU in a plurality of sub-blocks. That is, entropy decoding unit 70 may scan transform coefficients of the sub-blocks in a coefficient scan order and may scan the sub-blocks themselves in a sub-block scan order. According to aspects of this disclosure, entropy decoding unit 70 may use the same orientation (e.g., scan pattern, direction, or order) for the coefficient scan order and the sub-block scan order. That is, according to aspects of this disclosure, the orientation of the sub-block scan order may match that of the coefficient scan order. In other examples, the sub-block scan order may differ from the coefficient scan order (e.g., in examples in which the sub-block scan order and coefficient scan order are adaptively determined).

For example, entropy decoding unit 70 may receive a serialized array of transform coefficients associated with a TU. Entropy decoding unit 70 may scan the transform coefficients in sub-blocks to reconstruct a 2D TU. That is, entropy decoding unit 70 may scan the transform coefficients in coefficient scanning order, as well as scan the sub-blocks themselves in sub-block scanning order. In an example for purposes of illustration, entropy decoding unit 70 may diagonally scan each of the received transform coefficients in coefficient scan order to reconstruct a 2D sub-block.

Entropy decoding unit 70 may also diagonally scan reconstructed sub-blocks (as the sub-blocks are generated) in sub-block scan order to reconstruct the TU. In some examples, entropy decoding unit 70 may perform the scans in reverse. In addition, according to some aspects, entropy decoding unit 70 may scan and code the sub-blocks sequentially. That is, entropy decoding unit 70 may scan and decode all bins associated with transform coefficients of a current a sub-block in coefficient scan order before moving on to the next sub-block in sub-block scan order. In other examples, entropy decoding unit 70 may decode a particular bin for the entire TU (including all sub-blocks) before decoding the next bin.

According to some aspects, entropy decoding unit 70 may perform an adaptive sub-block scanning order. In one example, the sub-block adaptive scanning order may be used in place of the strong horizontal and vertical scanning orders, as described above, for relatively large block sizes (e.g. 32×32 or 16×16 block sizes). Entropy decoding unit 70 may adaptively determine the sub-block scan order and the coefficient scan order for a block based on block size, prediction mode of the block (e.g., intra/inter prediction mode), neighboring block's information (prediction mode, motion information, scan index), and/or from a full rate-distortion decision at the encoder and syntax from the encoded bitstream at the decoder.

In some examples, dividing a block of transform coefficients into sub-blocks may create a context dependency within the sub-blocks (e.g., when entropy coding using context) information). For example, when scanning within the sub-blocks using a diagonal scan, a context for a top left coefficient within a sub-block may depend on the previous coefficient being processed (e.g., the transform coefficient positioned below the current transform coefficient). The context dependency may impose an undesired delay when entropy coding. To avoid this dependency and thus enhance parallelization, entropy decoding unit 70 may use a modified context support neighborhood. For example, entropy decoding unit 70 may use a context support neighborhood that removes the context dependency of two consecutive coefficients, allowing entropy decoding unit 70 to decode two bins in parallel. In some examples, entropy decoding unit 70 may increase the dependency removal from two to three, four or more consecutive coefficients. In those cases, the context support neighborhood at each position may be modified to remove context dependencies in the neighborhood given a particular scan order.

The 2D array of transform coefficients produced by entropy decoding unit 70 may be quantized and may generally match the 2D array of transform coefficients scanned by the entropy encoding unit 56 of the video encoder 20 to produce the 1D vector of transform coefficients. Inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. Inverse quantization unit 76 may inverse quantize the transform coefficients either before or after the coefficients are converted from a 1D vector to a 2D array.

Inverse transform unit 58 applies an inverse transform, e.g., an inverse DCT, an inverse integer transform, an inverse KLT, an inverse rotational transform, an inverse directional transform, or another inverse transform. In some examples, inverse transform processing unit 78 may determine an inverse transform based on signaling from the video encoder 20, or by inferring the transform from one or more coding characteristics such as block size, coding mode, or the like. In some examples, inverse transform processing unit 78 may determine a transform to apply to the current block based on a signaled transform at the root node of a quadtree for an LCU including the current block. In some examples, inverse transform processing unit 78 may apply a cascaded inverse transform. In examples in which the received coefficients were coded using a so-called skip mode, inverse transform unit 58 may not apply a transform.

Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 and intra-prediction unit 74, in an HEVC example, may use some of the syntax information (e.g., provided by a quadtree) to determine sizes of LCUs used to encode picture(s) of the encoded video sequence. Motion compensation unit 72 and intra-prediction unit 74 may also use syntax information to determine split information that describes how each CU of a picture of the encoded video sequence is split (and likewise, how sub-CUs are split). The syntax information may also include modes indicating how each split is encoded (e.g., intra- or inter-prediction, and for intra-prediction an intra-prediction encoding mode), one or more reference pictures (and/or reference lists containing identifiers for the reference pictures) for each inter-encoded PU, and other information to decode the encoded video sequence.

Summer 80 combines the residual blocks with the corresponding prediction blocks generated by motion compensation unit 72 or intra-prediction unit 74 to form decoded blocks. For example, summer 80 may combine a predictive pixel value (e.g., luma and/or chroma) with a residual pixel difference value to reconstruct a pixel value. If desired, a deblocking filter may also be applied to filter the decoded blocks in order to remove blockiness artifacts. The decoded video blocks are then stored in reference picture buffer 82, which provides reference blocks for subsequent motion compensation and also produces decoded video for presentation on a display device (such as display device 32 of FIG. 1).

Figure 4:
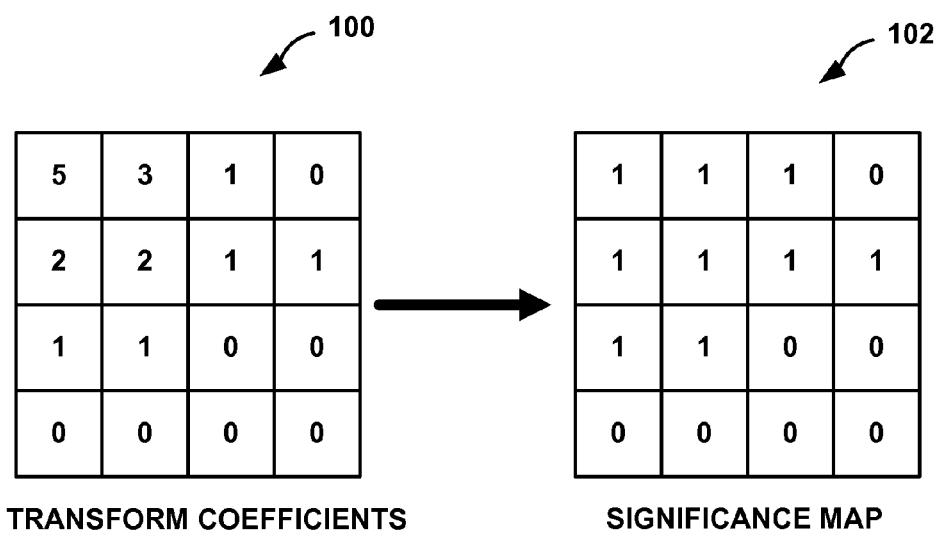
FIG. 4 is a conceptual diagram illustrating a significance map coding process.

FIG. 4 is a conceptual diagram that generally illustrates the coding of a significance map. For example, as noted above, a video encoder (such as video encoder 20) may encode the positions of the significant coefficients (i.e., nonzero transform coefficients) in a transform block (e.g., a TU) prior to encoding the values of the coefficients (levels). The process of coding the significance map may be referred to as significance map coding, which require a relatively large percentage of the bit-rate. A video decoder (such as video decoder 30) may receive the significance map and determine the locations of the significant transform coefficients.

The example of FIG. 4 shows a 4×4 block of quantized transform coefficients 100 having three significant coefficients in the first row, four significant coefficients in the second row, two significant coefficients in the third row, and no significant coefficients in the fourth row. Significance map 102 includes a (1) in each location of a significant transform coefficient and a (0) in each location of a zero valued transform coefficient. In general, after determining the locations of the significance transform coefficients, video encoder 20 may serialize and encode significance map 102. Likewise, video decoder 30 may receive a serialized significance map 102 to reconstruct the locations of the significant coefficients.

An example process for coding a significance map is described in D. Marpe, H. Schwarz, and T. Wiegand "Context-Based Adaptive Binary Arithmetic Coding in the H.264/AVC Video Compression Standard," IEEE Trans. Circuits and Systems for Video Technology, vol. 13, no. 7, July 2003. In this process, the significance map is coded if there is at least one significant coefficient in the block, as indicated by the Coded Block Flag (CBF), which may be defined as:

Coded Block Flag: coded_block_flag is a one-bit symbol, which indicates if there are significant, i.e., nonzero coefficients inside a single block of transform coefficients, for which the coded block pattern indicates nonzero entries. If coded_block_flag is zero, no further information is transmitted for the related block.

If there are significant coefficients in the block, the significance map is encoded by following a scan order of transform coefficients in the block as follows:

Scanning of Transform Coefficients: two-dimensional arrays of transform coefficient levels of sub-blocks for which the coded_block_flag indicates nonzero entries are first mapped into a one-dimensional list using a given scanning pattern. In other words, sub-blocks with significant coefficients are scanned according to a scanning pattern.

Given the scanning pattern, the significance map may be scanned as follows:

Significance Map: If the coded_block_flag indicates that a block has significant coefficients, a binary-valued significance map is encoded. For each transform coefficient in the scanning order, a one-bit symbol significant_coeff_flag is transmitted. If the significant_coeff_flag symbol is one, i.e., if a nonzero coefficient exists at this scanning position, a further one-bit symbol last_significant_coeff_flag is sent. This symbol indicates if the current significant coefficient is the last one inside the block or if further significant coefficients follow. If the last scanning position is reached and the significance map encoding was not already terminated by a last_significant_coeff_flag with value one, it is apparent that the last coefficient has to be significant.

Other video coding standards may use a different process to code significance information. For example, the proposed HEVC standard uses a similar process to that described above, but does not code a last significant coefficient flag. Instead, according to HEVC, a last significant coefficient may be identified, and a scan may proceed from the last significant coefficient to the first significant coefficient in reverse order.

According to aspects of this disclosure, significance map 102 may form a portion of a larger significance map. That is, for example, significance map 102 may be a sub-block of significance flags for a larger block of significance flags. In such examples, according to aspects of this disclosure, a video coder may scan significance map 102 and the larger significance map using a scan having the same orientation. In addition to significance map 102, as described in greater detail below, a variety of other bins (e.g., sign, level, and the like) may also be scanned in the same or different orientations as significance map 102.

FIGS. 5A-5F generally illustrate scanning patterns and directions for coding transform coefficients. For example, the scan patterns shown in FIGS. 5A-5F may be used by a video encoder (such as video encoded 20) as coefficient scan orders when serializing a 2D array of transform coefficients (e.g., significance, levels, sign, and the like). In another example, the scan patterns may be used by a video decoder (such as video decoder 30) as coefficient scan orders when reconstructing a block of transform coefficients from a received serialized array of coded transform coefficients.

Figure 5A:
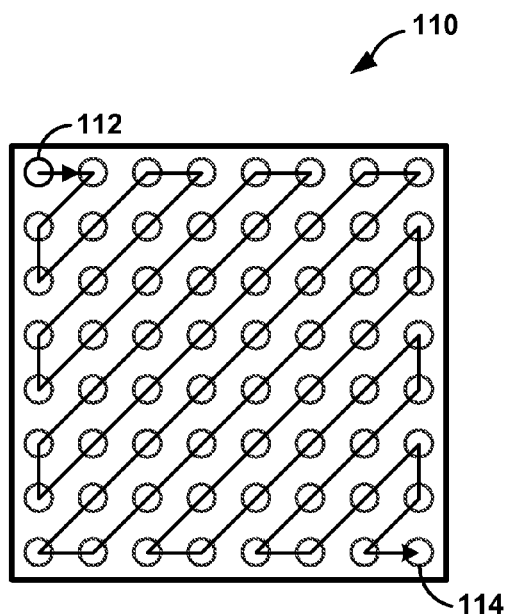
FIG. 5A is a conceptual diagram illustrating example scanning patterns and directions for transform coefficient coding.

In some examples, the scan patterns and directions shown in FIGS. 5A-5F may be implemented by a video coder when scanning a significance map (such as significance map 102 shown in FIG. 4), as well as transform coefficient levels. For example, FIG. 5A illustrates a forward zig-zag scan pattern 110 for scanning transform coefficients of a block of video data (e.g., transform coefficients associated with a TU). In general, the zig-zag scan pattern 110 traverses the block at alternating 45 degree angles from the top-left of the block to the bottom-right of the block. That is, in the example shown in FIG. 5A, a first coefficient 112 is a DC component positioned at the upper left corner of the block, while a last coefficient 114 to be scanned is positioned at the bottom right corner of the block.

Figure 5B:
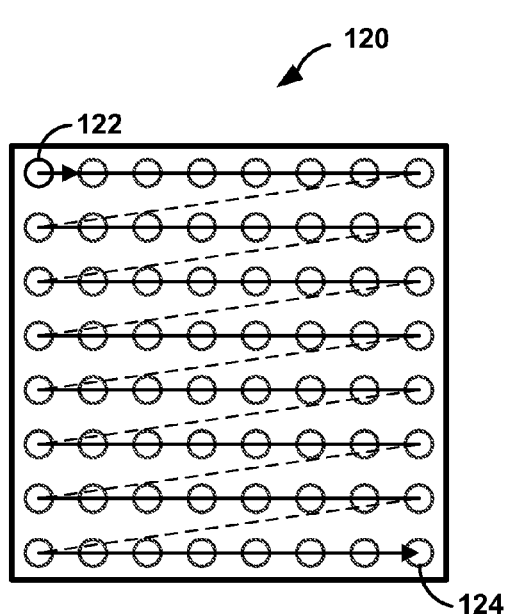
FIG. 5B is another conceptual diagram illustrating example scanning patterns and directions for transform coefficient coding.

FIG. 5B illustrates a forward horizontal scan pattern 120 for scanning transform coefficients of a block of video data. In general, the forward horizontal scan pattern 120 traverses the block from left to right and from top to bottom. That is, in the example shown in FIG. 5B, a first coefficient 122 is a DC component positioned at the upper left corner of the block, while a last coefficient 124 to be scanned is positioned at the bottom right corner of the block. The forward horizontal scan pattern 120 proceeds from the first coefficient 122 across the top of the block from left to right. Each following row is scanned from left to right until reaching the last coefficient 124.

Figure 5C:
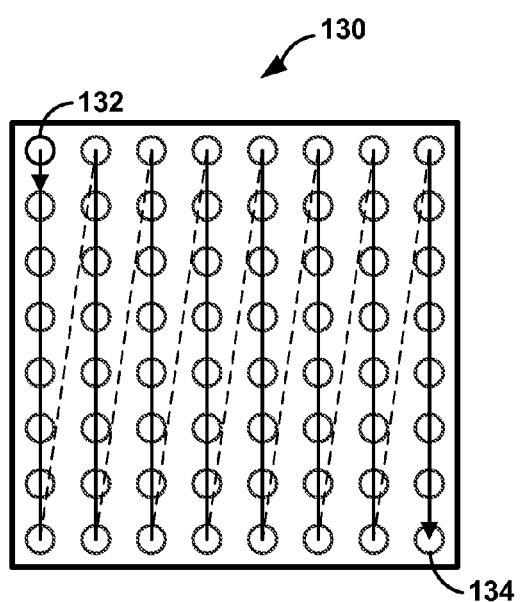
FIG. 5C is another conceptual diagram illustrating example scanning patterns and directions for transform coefficient coding.

FIG. 5C illustrates a forward vertical scan pattern 130 for scanning transform coefficients of a block of video data. In general, the forward vertical scan pattern 130 traverses the block from top to bottom and from left to right. That is, in the example shown in FIG. 5C, a first coefficient 132 is a DC component positioned at the upper left corner of the block, while a last coefficient 134 to be scanned is positioned at the bottom right corner of the block. The forward vertical scan pattern 130 proceeds from the first coefficient 132 downward toward the relative bottom of the block. Each following column is scanned from top to bottom until reaching the last coefficient 134.

Figure 5D:
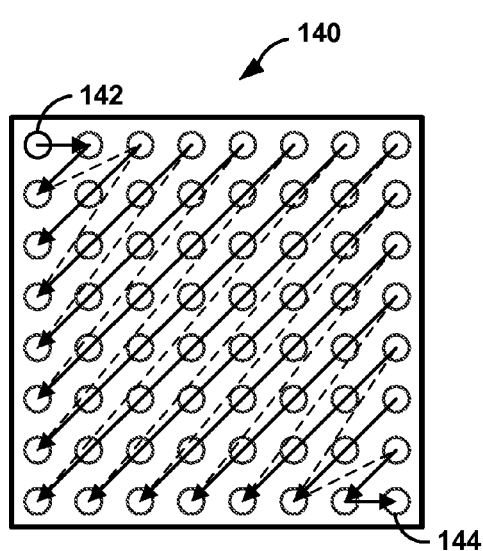
FIG. 5D is another conceptual diagram illustrating example scanning patterns and directions for transform coefficient coding.

FIG. 5D illustrates a diagonal scan pattern 140 for scanning transform coefficients of a block of video data. In general, the diagonal scan pattern 140 traverses the block at a 45 degree angle from top-right to bottom-left (e.g., the top-left corner of the block to the bottom-right corner for the block). That is, in the example shown in FIG. 5D, a first coefficient 142 is a DC component positioned at the upper left corner of the block, while a last coefficient 144 to be scanned is positioned at the bottom right corner of the block. Each of the diagonal lines in diagonal scan patter 140 traverse the block at a 45 degree angle from the upper right corner of the block to the lower left corner of the block.

Figure 5E:
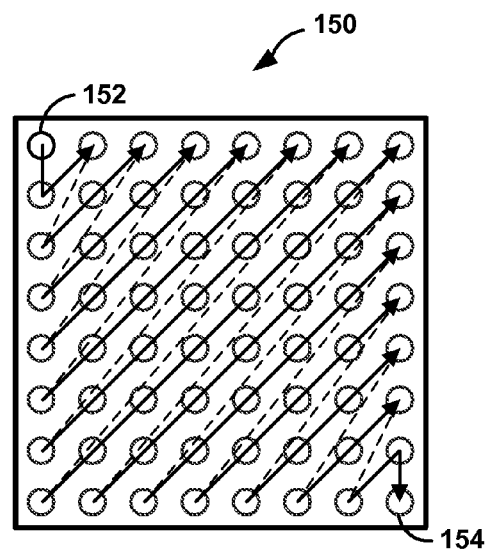
FIG. 5E is another conceptual diagram illustrating example scanning patterns and directions for transform coefficient coding.

FIG. 5E illustrates another diagonal scan pattern 150 for scanning transform coefficients of a block of video data. In general, the diagonal scan pattern 150 traverses the block at a 45 degree angle from top-right to bottom-left (e.g., the top-left corner of the block to the bottom-right corner of the block). That is, in the example shown in FIG. 5E, a first coefficient 152 is a DC component positioned at the upper left corner of the block, while a last coefficient 154 to be scanned is positioned at the bottom right corner of the block. However, the diagonal scan pattern 150 proceeds in the opposite direction as the diagonal scan pattern 140. Each of the diagonal lines in diagonal scan pattern 150 traverse the block at a 45 degree angle from the lower left corner of the block to the upper right corner of the block.

Each of the scans shown in FIGS. 5A-5E proceeds in a forward direction, i.e., from lower frequency transform coefficients in the upper left corner of the transform block to the higher frequency transform coefficients in the lower right corner of the transform block. Alternatively, each of the scans may proceed in a reverse, or inverse direction (i.e., from the lower right corner of the block to the upper left corner). In such an example, as noted above, zero valued transform coefficients may be positioned at the beginning of the serialized array.

Figure 5F:
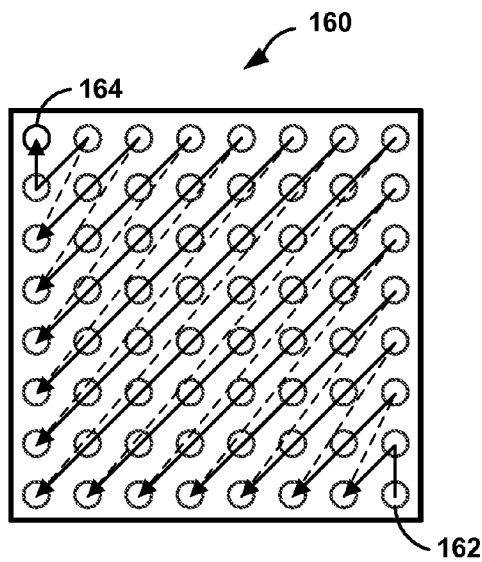
FIG. 5F is another conceptual diagram illustrating example scanning patterns and directions for transform coefficient coding.

For example, FIG. 5F illustrates the reverse diagonal scan pattern as that shown in FIG. 5E. That is, FIG. 5F illustrates a reverse diagonal scan pattern 160 for scanning transform coefficients of a block of video data (e.g., transform coefficients associated with a TU). In general, the reverse diagonal scan pattern 160 traverses the block at a 45 degree angle from right to left and from bottom to top. That is, in the example shown in FIG. 5F, a first coefficient 162 is positioned at the lower right corner of the block, while a last coefficient 164 to be scanned is positioned at the top left corner of the block. In other words, each of the diagonal lines in diagonal scan pattern 160 traverse the block at a 45 degree angle from the upper right corner of the block to the lower left corner of the block. The DC coefficient may remain in the upper left corner of the block, with high frequency coefficients in the lower right corner of the block.

It should be understood that the scan pattern shown in FIGS. 5A-5F are provided for purposes of illustration only. In addition, different components associated with transform coefficients (e.g., significance, sign, level, and the like) may be scanned using scans of different orientations. Coefficient level may be scanned and coded with syntax elements indicating whether a coefficient has a level greater than one, and a level greater than two, as well as a remaining level, e.g., greater than two. In some instances, significance information (e.g., significance flags) may be scanned in the opposite direction of transform coefficient levels (e.g., one or more syntax elements associated with the coefficient levels). In other instances, a unified scanning pattern may be implemented, such that significance information and transform coefficient levels are scanned and coded in the same direction.

While the scans shown in FIGS. 5A-5F are generally depicted as being performed for an entire block, according to aspects of this disclosure, and as described in greater detail below, such scans may be used within and across sub-blocks of transform coefficients. That is, as an example, the reverse diagonal scan pattern 160 shown in FIG. 5F may be used as a coefficient scan order for scanning transform coefficients within sub-blocks, as well as a sub-block scan order for scanning sub-blocks themselves.

Figure 6:
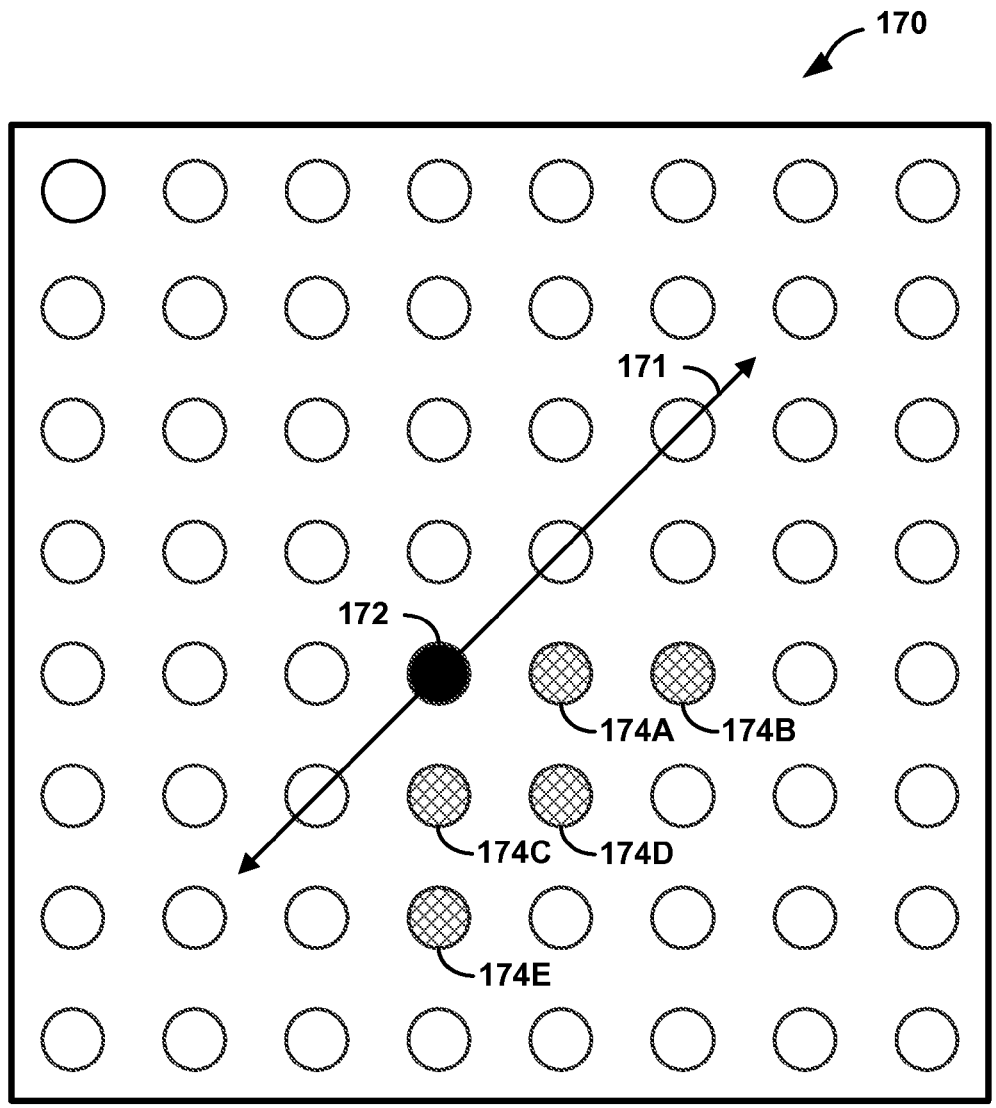
FIG. 6 is a conceptual diagram illustrating an example of context-adaptive coding of transform coefficients of a block of video data.

FIG. 6 is a conceptual diagram illustrating an example of a context support neighborhood for a diagonally oriented scan path. For example, FIG. 6 illustrates a block of transform coefficients 170 and a diagonally oriented scan line 171 passing through a transform coefficient position currently being coded 172. In addition, the example of FIG. 6 shows a context support neighborhood 174A-174E (collectively, context support neighborhood 174) having five elements.

For example, as noted above, each bin for a block of video data, whether corresponding to residual transform coefficient level or significance map information for the block, may be coded using probability estimates for the bin that indicate a likelihood of the bin having a given value (e.g., "0" or "1"). The probability estimates are included within a probability model, also referred to as a "context model." The probability model is selected by determining a context for the bin, which may be identified by a context support neighborhood. That is, a context support neighborhood may identify the relative positions of syntax elements that may be used for entropy coding a particular symbol or flag associated with a transform coefficient. The context, e.g., the actual values located in the context neighborhood positions, determine the probability model.

In the example shown in FIG. 6, any of the transform coefficients along scan pattern line 171 may be coded in parallel. Such a scan pattern may be referred to as "parallel friendly." That is, positions along scan line 171 can be coded in parallel, because no one position in scan line 171 includes a context support neighborhood that depends on another position in scan line 171. Accordingly, scan line 171 allows context of plurality of significance flags to be calculated in parallel, thereby enabling context pre-fetching for significance flag coding. Such a scan line may also facilitate coding of multiple significance flags using speculative computation.

However, as described in greater detail below with respect to FIGS. 11 and 12, in some examples, dividing a block of transform coefficients into sub-blocks may create a context dependency within the sub-blocks (e.g., when entropy coding using context). That is, a context support neighborhood for some positions in a sub-block may rely on previous coefficient)s in the scan order from the sub-block. Accordingly, aspects of this disclosure relate to determining a context support neighborhood for sub-block scanning that allows more than one significance flag to be coded in parallel (e.g., the context may be pre-fetched for more than one position in a sub-block).

Figure 7:
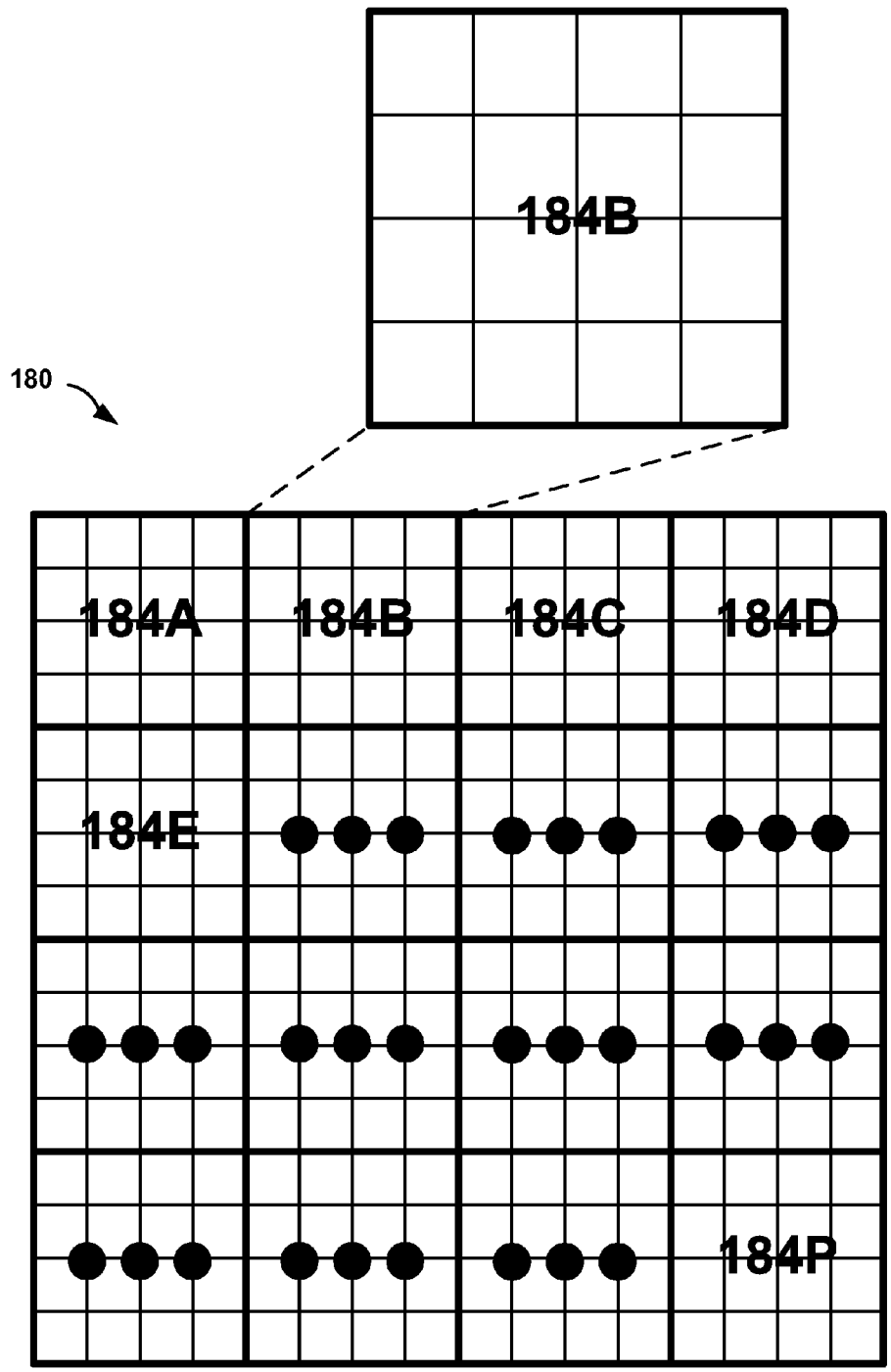
FIG. 7 is a conceptual diagram illustrating an example of dividing a block of transform coefficients into sub-blocks.

FIG. 7 generally illustrates dividing a block of transform coefficients 180 into sub-sets in the form of sub-blocks 184A-184P (collectively, sub-blocks 184). For example, a video coder (such as video encoder 20 or video decoder 30) may divide block 180 into sub-blocks 184 when scanning and entropy coding block 180.

According to aspects of this disclosure, as described in greater detail below, transform coefficients within sub-blocks 184 may be scanned in a coefficient scan order. In addition, each of the sub-blocks 184 may be scanned in a sub-block scan order. In some examples, according to aspects of this disclosure, the coefficient scan order may match that of the sub-block scan order.

In some examples, the video coder may code significance information and coefficient levels of the sub-blocks 184 in more than one pass. For example, the video coder may perform a first pass to code significance information. The video coder may then perform another pass to code the bin 1 (e.g., greater than one) of the transform coefficient levels, another pass to code bin 2 (e.g., greater than 2) of the transform coefficient levels, another pass to code the remaining bins (e.g, remaining level) of the transform coefficient levels, and another pass to code the sign of the transform coefficient levels. The five passes described above are provided for purposes of example only, however, and a different coding system may be used.

According to some aspects of this disclosure, the video coder may code each of sub-blocks 184 sequentially. That is, the video coder may perform the five coding passes described above for sub-block 184A in transform coefficient scan order. The video coder may then move to the next sub-block in sub-block scan order and perform the same five coding passes in transform coefficient scan order. In other examples, a coding pass may be performed for the entire block 180 before moving on to the next coding pass. That is, the video coder may perform a first coding pass for block 180 for all transform coefficients of sub-blocks 184 in a transform coefficient scan order and for all sub-blocks 184 in a sub-block scan order. The video coder may then perform the next coding pass for block 180 in the same way until all the coding passes have been completed.

In some examples, the video coder may use a unified scan for scanning transform coefficients of sub-blocks 184. For example, the video coder may scan significance information and coefficient levels using a scan having the same orientation (e.g., a diagonal scan). In other examples, the video coder may scan components of transform coefficients (e.g., significance, sign, levels, and the like) using reverse scans or scans having other orientations. For example, the video coder may initially scan significance map information in a forward scan. The video coder may then scan one or more coefficient level bins in a reverse scan.

While in the example shown in FIG. 7, block 180 is 16×16 transform coefficients in size, it should be understood that larger or smaller blocks may be similarly divided. Moreover, while sub-blocks 184 that are 4×4 in size, it should be understood that larger or smaller sub-blocks may be used. That is, in other examples, the size of the sub-blocks may be 2×2, 8×8, 16×16, or n×n, as long as the sub-block size is smaller than or equal to the original block size. How a particular block of transform coefficients is sub-divided may be predetermined based on the size of the block. As such, a video decoder may infer how to sub-divide the block based on its size. In other examples, the number and/or size of the sub-blocks may be indicated in the encoded video bitstream by the encoder.

FIGS. 8A-8E generally illustrate scanning patterns and directions for coding sub-blocks of transform coefficients. For example, the scan patterns shown in FIGS. 8A-8E may be used by a video encoder (such as video encoded 20) as sub-block scan orders when serializing a 2D array of transform coefficients (e.g., significance, levels, sign, and the like). In another example, the scan patterns may be used by a video decoder (such as video decoder 30) as sub-block scan orders when reconstructing a block of transform coefficients from a received serialized array of coded transform coefficients.

Figure 8A:
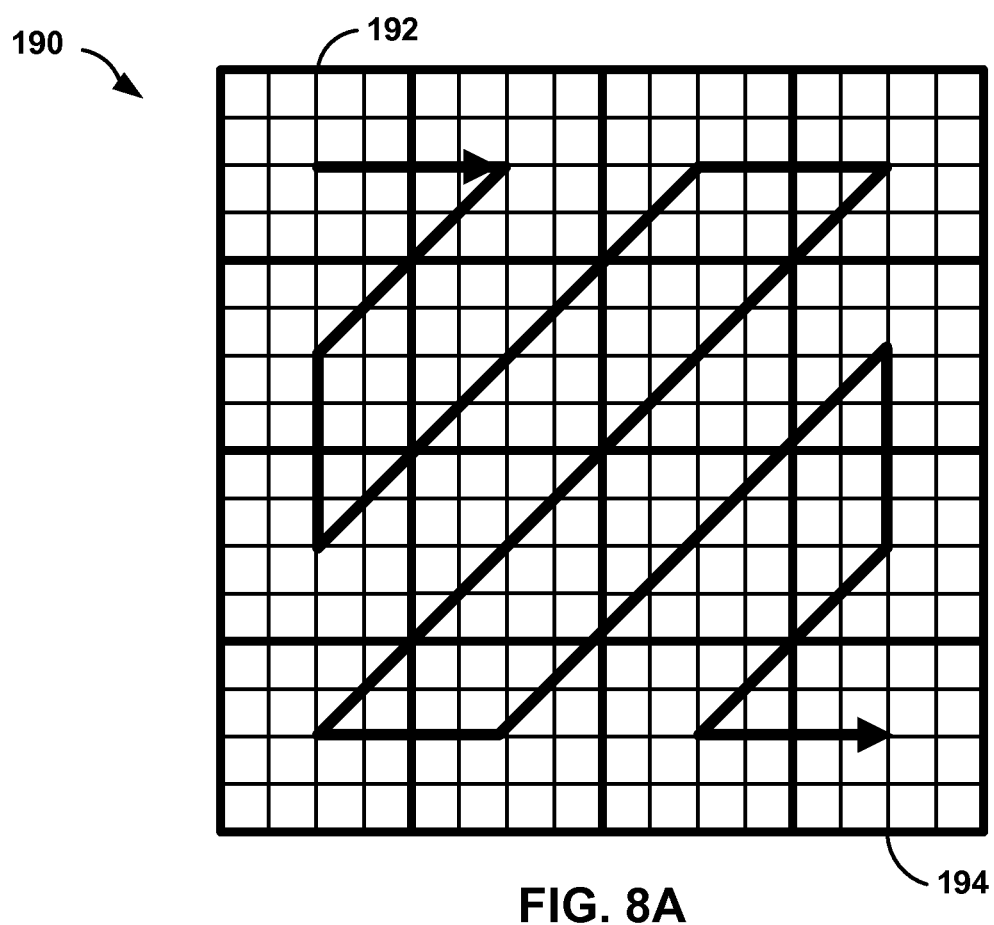
FIG. 8A is a conceptual diagram illustrating an example zig-zag sub-block scan order for a block of transform coefficients divided into sub-blocks.

For example, FIG. 8A generally illustrates a forward zig-zag sub-block scan order 190 for scanning across sub-blocks (4×4 sub-blocks, shown with a heavier border) of a block of transform coefficients. In general, the forward zig-zag sub-block scan order 190 traverses each of the sub-blocks from a relative first sub-block 192 in the upper left corner of the block to a last sub-block 194 in the lower right corner of the block at alternating 45 degree angles from the relative top of the block to the relative bottom of the block.

Figure 8B:
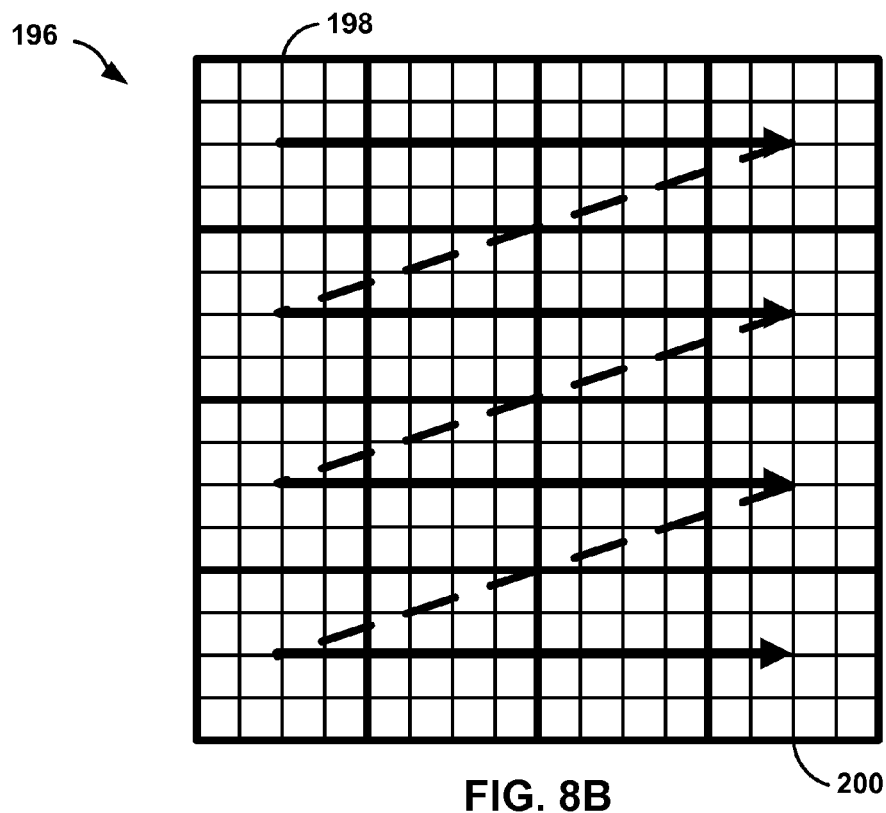
FIG. 8B is a conceptual diagram illustrating an example horizontal sub-block scan order for a block of transform coefficients divided into sub-blocks.

FIG. 8B generally illustrates a forward horizontal sub-block scan order 196 for scanning across sub-blocks (4×4 sub-blocks, shown with a heavier border) of a block of transform coefficients. In general, the forward horizontal sub-block scan order 196 traverses each of the sub-blocks from a relative first sub-block 198 in the upper left corner of the block to a last sub-block 200 in the lower right corner in a series of horizontal lines from left to right and top to bottom. That is, in the example shown in FIG. 8B, the forward horizontal sub-block scan order proceeds from the first sub-block 198 across the top of the block from left to right. Each following row is then scanned from left to right until reaching the last sub-block 200.

Figure 8C:
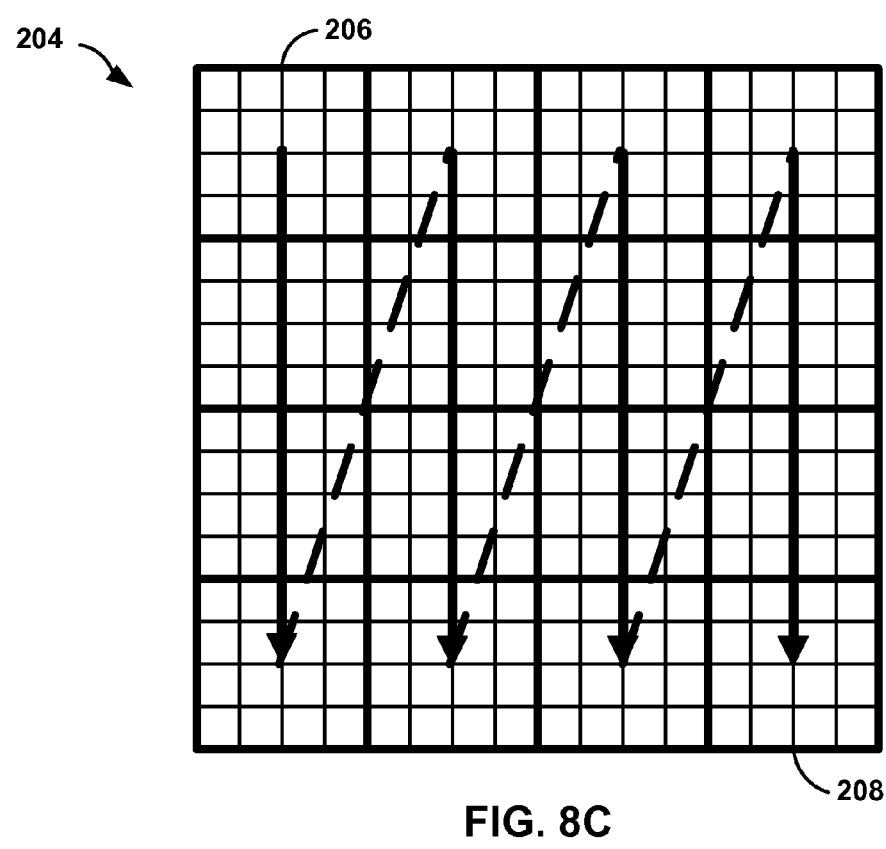
FIG. 8C is a conceptual diagram illustrating an example vertical sub-block scan order for a block of transform coefficients divided into sub-blocks.

FIG. 8C illustrates a forward vertical sub-block scan order 204 for scanning across sub-blocks (4×4 sub-blocks, shown with a heavier border) of a block of transform coefficients. In general, the forward vertical sub-block scan order 204 traverses each of the sub-blocks from a relative first sub-block 206 in the upper left corner of the block to a last sub-block 208 in the lower right corner in a series of vertical lines from top to bottom and left to right. That is, in the example shown in FIG. 8C, the forward vertical sub-block scan order proceeds from the first sub-block 206 downward toward the relative bottom of the block. Each following column is scanned from top to bottom until reaching the last sub-block 208.

Figure 8D:
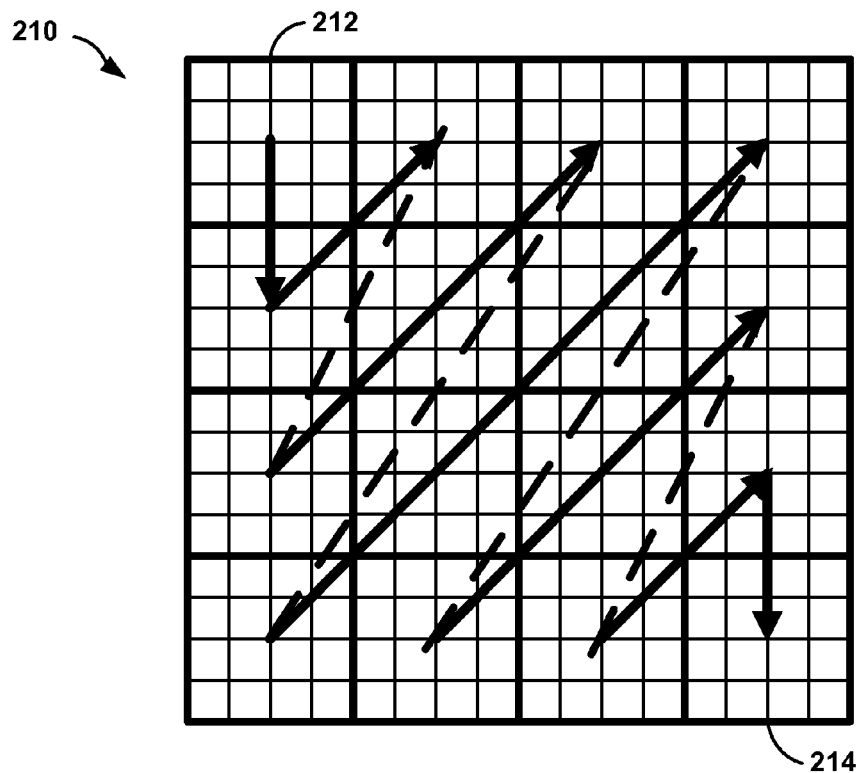
FIG. 8D is a conceptual diagram illustrating an example diagonal sub-block scan order for a block of transform coefficients divided into sub-blocks.

FIG. 8D generally illustrates a diagonal sub-block scan order 210 for scanning across sub-blocks (4×4 sub-blocks, shown with a heavier border) of a block of transform coefficients. In general, the diagonal sub-block scan order 210 traverses each of the sub-blocks from a relative first sub-block 212 in the upper left corner of the block to a last sub-block 214 in the lower right corner of the block at a 45 degree angle from left to right and from bottom to top. That is, in the example shown in FIG. 8D, the diagonal sub-block scan order 210 traverses the block at a 45 degree angle from the lower left corner of the block to the upper right corner of the block in consecutive diagonal lines from the first sub-block 212 to the last sub-block 214.

Each of the sub-block scans shown in FIGS. 8A-8D proceeds in a forward direction, i.e., from lower frequency transform coefficients in the upper left corner of the transform block to the higher frequency transform coefficients in the lower right corner of the transform block. Alternatively, each of the scans may proceed in a reverse, or inverse direction (i.e., from the lower right corner of the block to the upper left corner). In such an example, as noted above, zero valued transform coefficients may be positioned at the beginning of the serialized array. If the position of the last coefficient is coded explicitly in the bitstream, the reverse sub-block scan may begin from the sub-block that contains the last significant coefficient with respect to the forward scan. Also, within this sub-block, the scanning may begin from the last significant coefficient (for level coding) or the coefficient following the last significant coefficient in the inverse scan order. Alternatively, all of the sub-blocks and all of the coefficients may always be scanned, but coefficients that are after the last significant coefficient with respect to forward scan may be inferred to be zero.

Figure 8E:
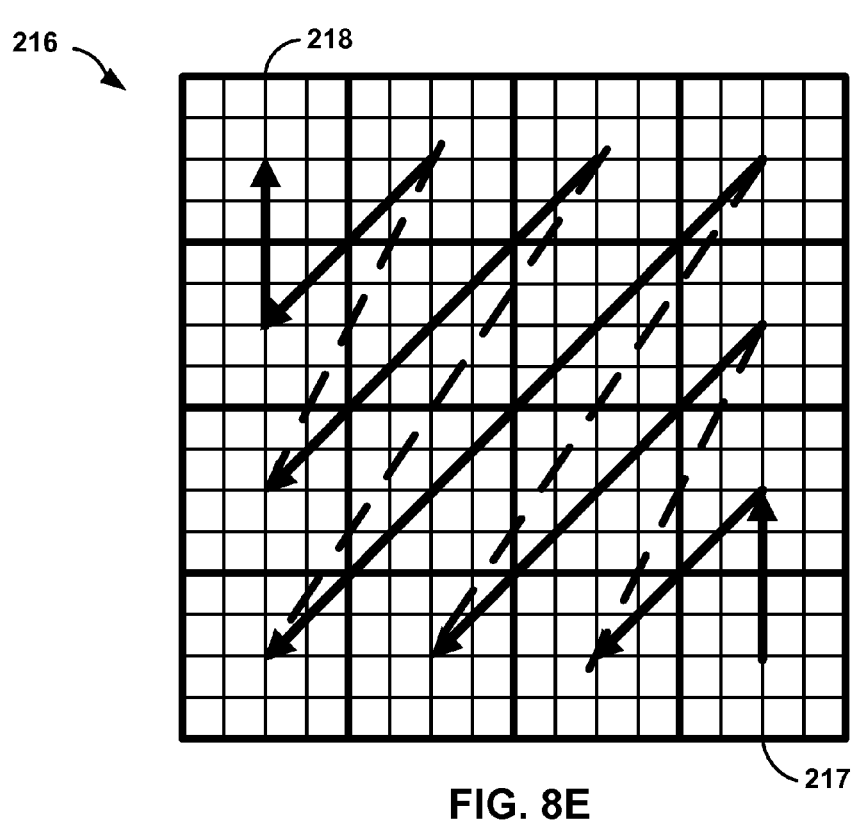
FIG. 8E is a conceptual diagram illustrating an example diagonal sub-block scan order for a block of transform coefficients divided into sub-blocks that is the reverse of the scan shown in FIG. 8D.

For example, FIG. 8E generally illustrates a reverse diagonal sub-block scan order 216 for scanning across sub-blocks (4×4 sub-blocks, shown with a heavier border) of a block of transform coefficients in the reverse from the sub-block scan order shown in FIG. 8D. In general, the reverse diagonal sub-block scan order 216 traverses each of the sub-blocks from a relative first sub-block 217 in the lower right corner of the block to a last sub-block 218 in the upper left corner of the block at a 45 degree angle from right to left and from top to bottom. That is, in the example shown in FIG. 8E, the reverse diagonal sub-block scan order 216 traverses the block at a 45 degree angle from the upper right corner of the block to the lower left corner of the block in consecutive diagonal lines from the first sub-block 217 to the last sub-block 218.

It should be understood that the sub-block scan orders shown in FIGS. 8A-8E are provided for purposes of illustration only. In addition, different components associated with transform coefficients (e.g., significance, sign, level, and the like) may be scanned using scans of different orientations. For example, in some instances, significance information (e.g., significance flags) may be scanned in the opposite direction of transform coefficient levels. In other instances, a unified scanning pattern may be implemented, such that significance information and transform coefficient levels are scanned in the same direction.

According to aspects of this disclosure, the sub-block scan orders shown in FIG. 8A-8E may match the respective coefficient scan orders used to scan transform coefficients within each of the sub-blocks. That is, the coefficient scan order for scanning coefficients within each of the sub-blocks may be the same as the sub-block scan orders for scanning the sub-blocks themselves.

According to other aspects of this disclosure, the coefficient scan order and/or the sub-block scan order may be adaptive. That is, a video coder (such as video encoder 20 or video decoder 30) may select the sub-block scan order and/or the coefficient scan order for a block based on block size, intra/inter prediction mode, neighboring block's information (prediction mode, motion information, scan index), or other video coding characteristics. In another example, the sub-block scan order and the coefficient scan order may be determined from a rate-distortion analysis at video encoder 20. In this case, syntax (e.g., a block scan index from Table 1, shown below) indicating the sub-block scan order and the coefficient scan order may be signaled in the encoded video bitstream for use at the decoder.

Accordingly, the transform coefficients within each sub-block shown in FIGS. 8A-8E may be scanned according to the same or different scan orders. That is, zigzag, horizontal, diagonal or vertical scanning orders may be used to scan the transform coefficients within each sub-block. Again, each of these scanning orders may be in the forward or inverse direction. The coefficient scan order may be different or the same as sub-block scan order. In addition, the coefficient scan order may be the same for every sub-block in a block of transform coefficients, or the coefficient scan order for each sub-block may be chosen separately. For example, if both the sub-block scan order and the coefficient scan order use the three scans (i.e., diagonal, horizontal, and vertical) as shown in Table 1 below, the total number of potential scans for a block is 3×3=9.

TABLE 1

SCANNING ORDER COMBINATIONS

| Block Scan Index | Sub-block Scan | Coefficient Scan |
|---|---|---|
| 0 | Diagonal | Diagonal |
| 1 | Diagonal | Horizontal |
| 2 | Diagonal | Vertical |
| 3 | Horizontal | Diagonal |
| 4 | Horizontal | Horizontal |
| 5 | Horizontal | Vertical |
| 6 | Vertical | Diagonal |
| 7 | Vertical | Horizontal |
| 8 | Vertical | Vertical |

It should be understood that Table 1 is provided for purposes of example only, and that other scans may be available for selection during an adaptive scanning determination. For example, a zig-zag scan, reverse scans of any or all of the above scans, or scans of other orientations may also be available for selection. As mentioned elsewhere, the scanning techniques of this disclosure may be applicable for scanning processes used for CAVLC, CABAC, or other entropy coding techniques. For example, the aforementioned scanning techniques may be applicable for use significance map and coefficient level scanning for CABAC.

Figure 9A:
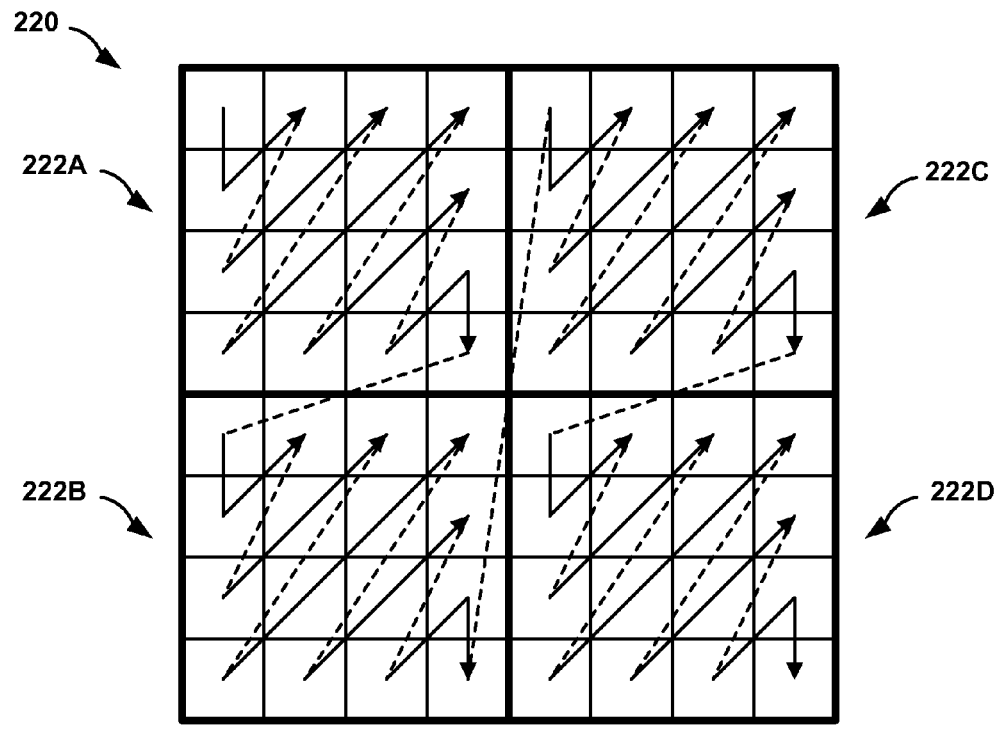
FIGS. 9A and 9B illustrate an example diagonal coefficient scan order for transform coefficients of sub-blocks and diagonal sub-block scan order for the sub-blocks.
Figure 9B:
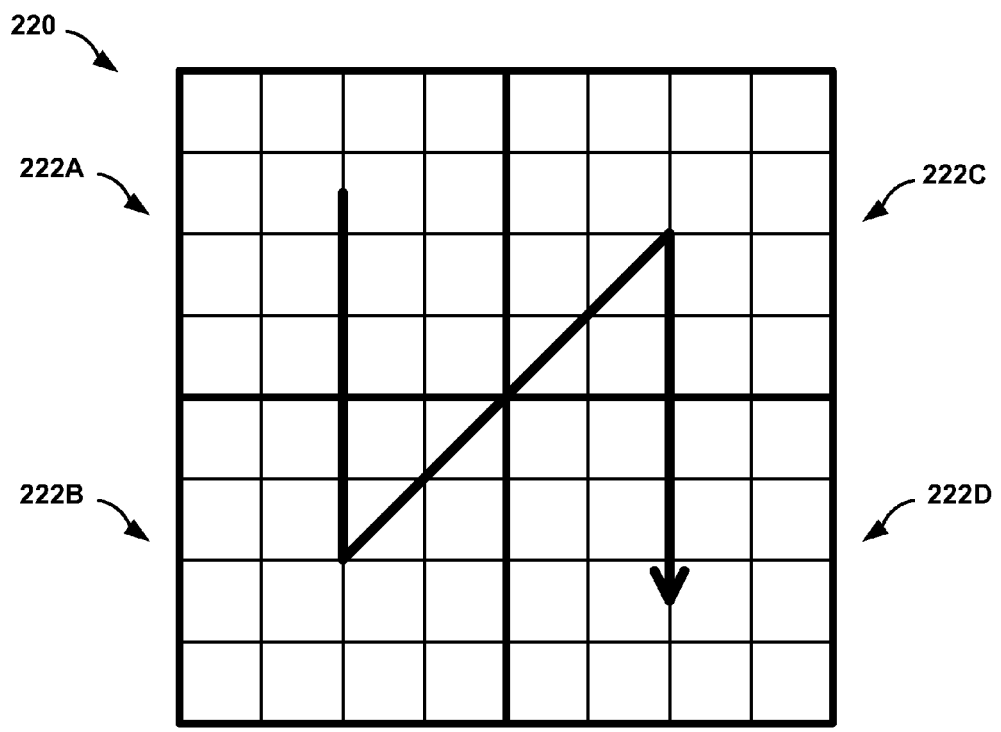

FIGS. 9A and 9B generally illustrate scanning transform coefficients of a plurality of sub-blocks in coefficient scan order, as well as scanning the plurality of sub-blocks in sub-block scan order in greater detail. For example, with respect to FIG. 9A, according to aspects of this disclosure, a video coder (such as video encoder 20 or video decoder 30) may divide block 220 into sub-blocks 222A, 222B, 222C, and 222D (collectively, sub-blocks 222) while coding block 220. That is, video encoder 20 may divide block 220 into sub-blocks 222 when serializing transform coefficients of block 220. Alternatively, video decoder 30 may reconstruct transform coefficients of block 220 using sub-blocks 222.

In any case, the example shown in FIG. 9A generally illustrates a diagonal coefficient scan order for scanning transform coefficients of block 220, while FIG. 9B generally illustrates a similarly oriented diagonal sub-block scan order for scanning sub-blocks 222. Accordingly, as shown in FIGS. 9A and 9B, a video coder may scan transform coefficients associated with a first sub-block 222A positioned in the upper left corner of block 220. The video coder may then scan transform coefficients associated with a second sub-block 222B positioned in the lower left corner of block 220, followed by a third sub-block 222C positioned in the upper right corner of block 220, and a fourth sub-block 222D positioned in the lower right corner of block 220.

As noted above, in some examples, the video coder may code significance information and coefficient levels of sub-blocks 222 in more than one pass. According to some aspects of this disclosure, the video coder may code each of sub-blocks 222 sequentially. That is, the video coder may perform all coding passes for sub-block 222A in transform coefficient scan order. The video coder may then move to sub-block 222B, followed by sub-block 222C and sub-block 222D, finishing coding of the coefficients in one sub-block before moving to the next sub-block.

In other examples, one coding pass of a plurality of coding passes may be performed for the entire block 220 before moving on to the next coding pass. That is, the video coder may perform a first coding pass for block 220 for all transform coefficients of sub-blocks 222 in a transform coefficient scan order and for all sub-blocks 222 in a sub-block scan order. The video coder may then perform the next coding pass for block 222 in the same way until all the coding passes have been completed.

In some examples, the video coder may use a unified scan for scanning transform coefficients of sub-blocks 222. For example, the video coder may scan significance information (e.g., significance flags) and coefficient levels using a scan having the diagonal orientation shown in FIGS. 9A and 9B. In other examples, the video coder may scan components of transform coefficients (e.g., significance, sign, levels, and the like) of block 222 using reverse scans or scans having other orientations. For example, the video coder may initially scan significance map information in a forward scan. The video coder may then scan one or more coefficient level bins in a reverse scan.

While the examples shown in FIGS. 9A and 9B generally illustrate a diagonal scan pattern, as noted above with respect to FIGS. 5A and 5B, a variety of other scan patterns may be used, such as a zig-zag pattern, an adaptive scan order, a horizontal pattern, a vertical pattern, and the like. In addition, while the examples shown in FIGS. 9A and 9B illustrate 8×8 blocks of transform coefficients with 4×4 sub-blocks, it should be understood that the techniques of this disclosure may be applied to blocks of other sizes, as well as sub-blocks of other sizes. For example, a sub-block may include any n×n block (or n×m block, in instances in which sub-blocks are not square) of transform coefficients of a transform unit (TU), where n×n is less than or equal to the size of the TU. In addition, sub-blocks of equal sizes, as shown in FIGS. 9A and 9B, may help to achieve hardware efficiency (e.g., hardware may be optimized to work with a static sub-block size). However, in other examples, the techniques of this disclosure may be applied to sub-blocks having different sizes.

Figure 10A:
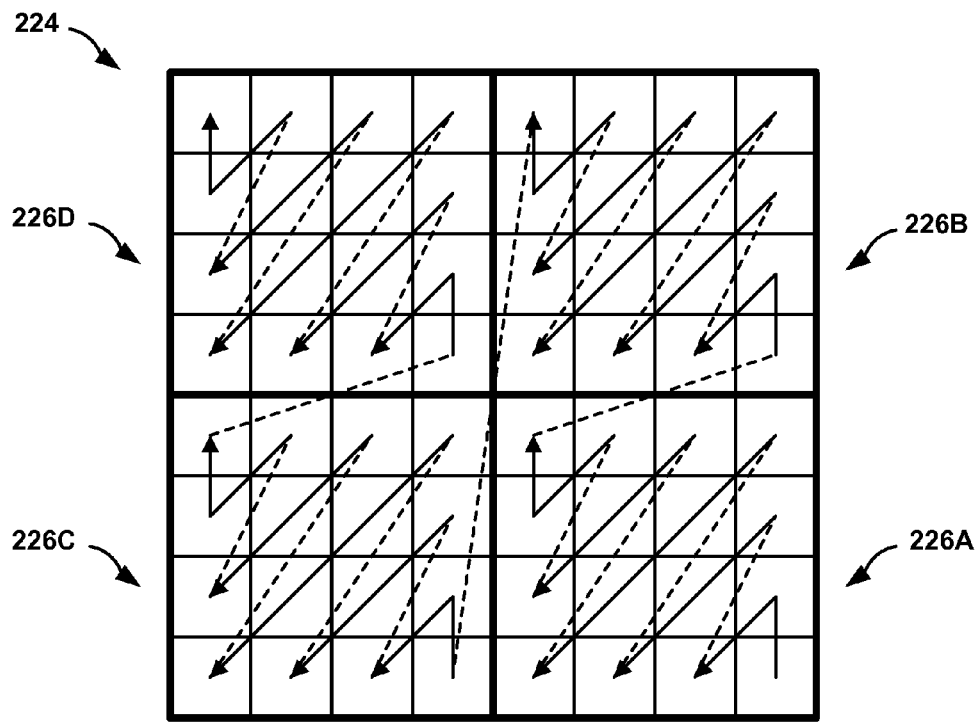
FIGS. 10A and 10B illustrate an example reverse diagonal coefficient scan order for transform coefficients of sub-blocks and reverse diagonal sub-block scan order for the sub-blocks with respect to the scans shown in FIGS. 9A and 9B.
Figure 10B:
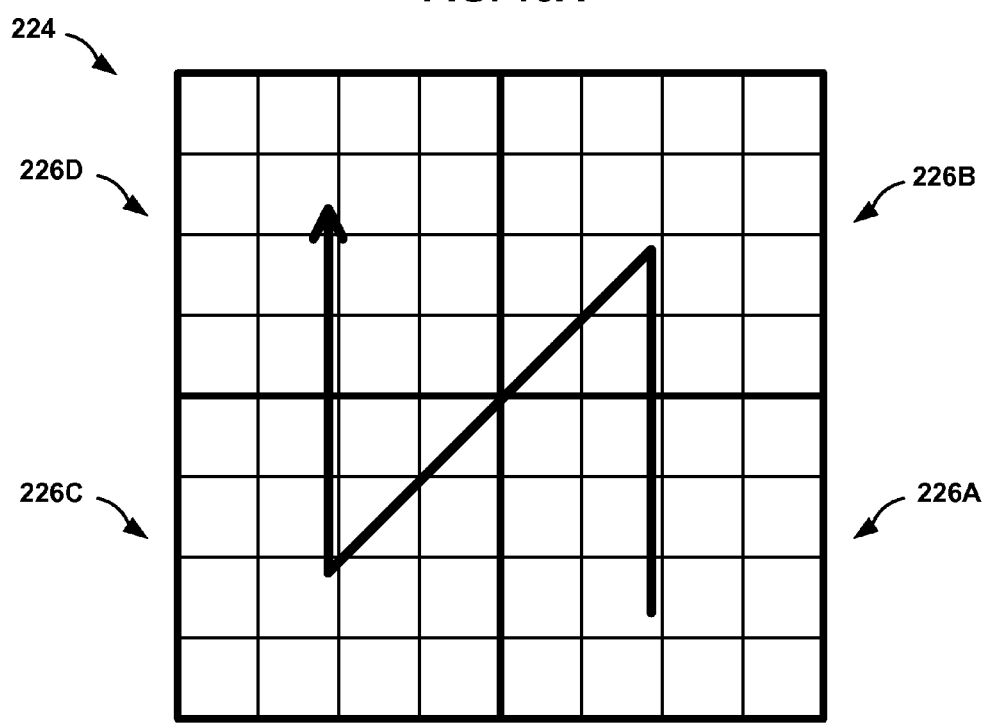

FIGS. 10A and 10B also generally illustrate scanning transform coefficients of a plurality of sub-blocks in coefficient scan order, as well as scanning the plurality of sub-blocks in sub-block scan order in greater detail. For example, with respect to FIG. 10A, according to aspects of this disclosure, a video coder (such as video encoder 20 or video decoder 30) may divide block 224 into sub-blocks 226A, 226B, 226C, and 226D (collectively, sub-blocks 226) while coding block 224. That is, video encoder 20 may divide block 224 into sub-blocks 226 when serializing transform coefficients of block 224. Alternatively, video decoder 30 may reconstruct transform coefficients of block 224 using sub-blocks 226.

The example shown in FIG. 10A generally illustrates a reverse diagonal coefficient scan order for scanning transform coefficients of block 224 (with respect to the diagonal scan order shown in FIG. 9A), while FIG. 10B generally illustrates a similarly oriented reverse diagonal sub-block scan order for scanning sub-blocks 222 (with respect to the diagonal scan order shown in FIG. 9B). Accordingly, as shown in FIGS. 10A and 10B, a video coder may initially scan transform coefficients associated with a first sub-block 226A positioned in the lower right corner of block 224. The video coder may then scan transform coefficients associated with a second sub-block 226B positioned in the upper right corner of block 224, followed by a third sub-block 226C positioned in the lower left corner of block 224, and a fourth sub-block 226D positioned in the upper left corner of block 224.

Figure 11A:
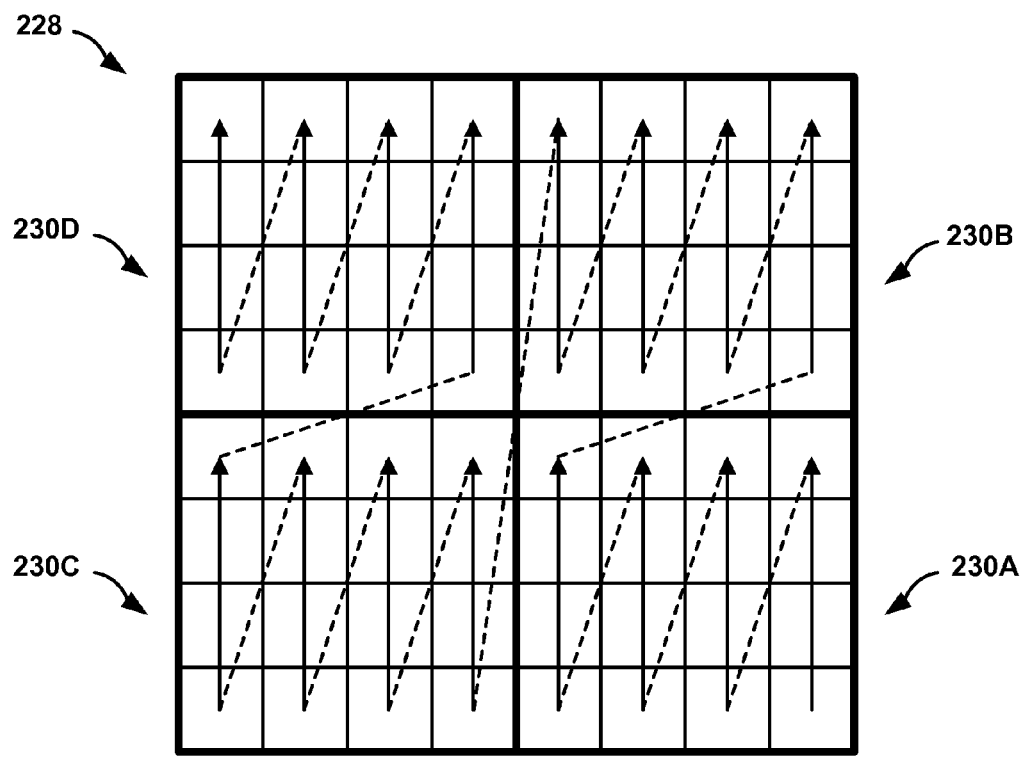
FIGS. 11A and 11B illustrate an example reverse vertical coefficient scan order for transform coefficients of sub-blocks and reverse vertical sub-block scan order for the sub-blocks.
Figure 11B:
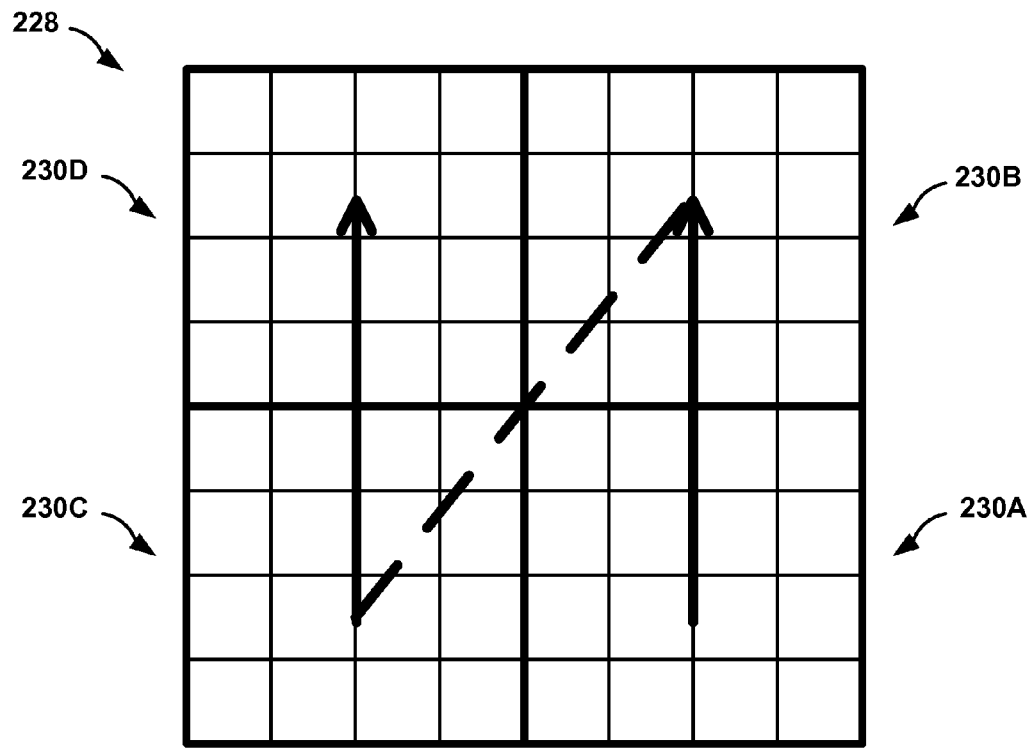

FIGS. 11A and 11B also generally illustrate scanning transform coefficients of a plurality of sub-blocks in coefficient scan order, as well as scanning the plurality of sub-blocks in sub-block scan order in greater detail. For example, with respect to FIG. 11A, according to aspects of this disclosure, a video coder (such as video encoder 20 or video decoder 30) may divide block 228 into sub-blocks 230A, 230B, 230C, and 230D (collectively, sub-blocks 230) while coding block 228. That is, video encoder 20 may divide block 228 into sub-blocks 230 when serializing transform coefficients of block 228. Alternatively, video decoder 30 may reconstruct transform coefficients of block 228 using sub-blocks 230.

The example shown in FIG. 11A generally illustrates a reverse vertical coefficient scan order for scanning transform coefficients of block 228, while FIG. 11B generally illustrates a similarly oriented reverse vertical sub-block scan order for scanning sub-blocks 230. Accordingly, as shown in FIGS. 11A and 11B, a video coder may initially scan transform coefficients associated with a first sub-block 230A positioned in the lower right corner of block 228. The video coder may then scan transform coefficients associated with a second sub-block 230B positioned in the upper right corner of block 228, followed by a third sub-block 230C positioned in the lower left corner of block 228, and a fourth sub-block 230D positioned in the upper left corner of block 228.

Accordingly, the example shown in FIGS. 11A and 11B includes a scan orientation having a reverse vertical orientation such that performing the scan on the block 228 includes vertically scanning transform coefficients of each of the plurality of sub-blocks 230 in the coefficient scan order from bottom to top and right to left within each of the plurality of sub-blocks, and vertically scanning across each of the plurality of sub-blocks in the sub-block scan order from bottom to top and right to left of the block 228.

Figure 12A:
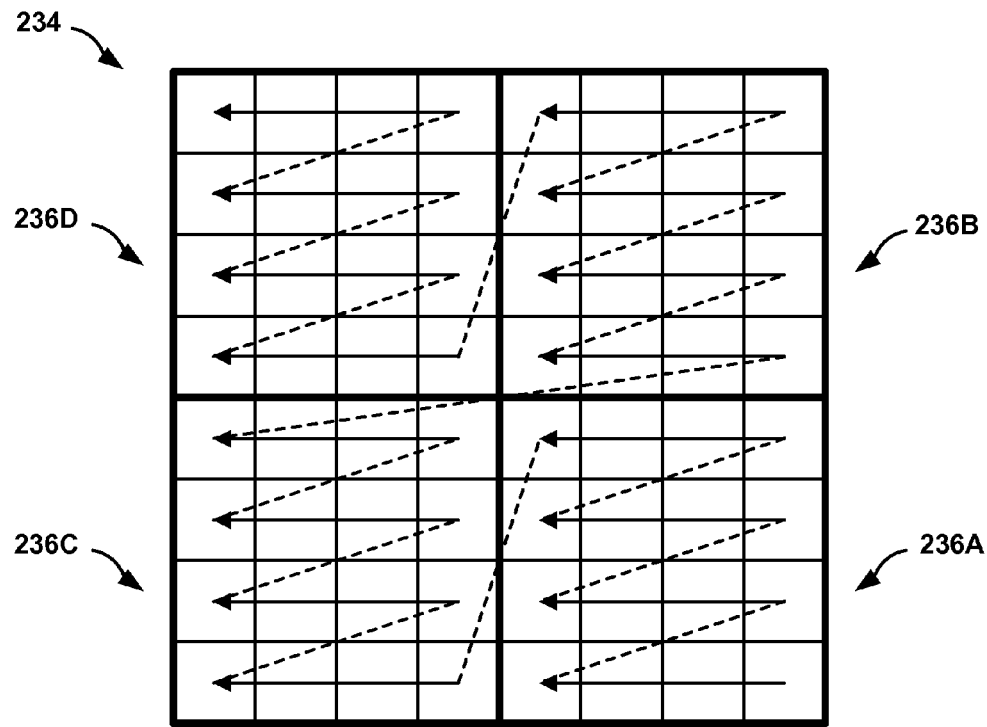
FIGS. 12A and 12B illustrate an example reverse horizontal coefficient scan order for transform coefficients of sub-blocks and reverse horizontal sub-block scan order for the sub-blocks.
Figure 12B:
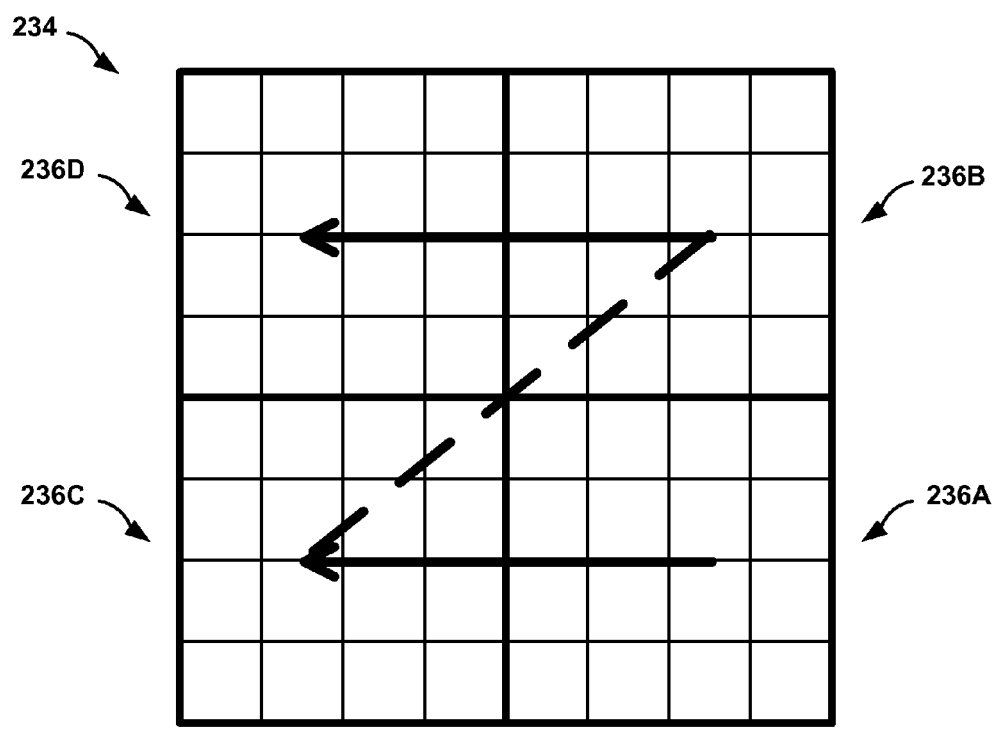

FIGS. 12A and 12B also generally illustrate scanning transform coefficients of a plurality of sub-blocks in coefficient scan order, as well as scanning the plurality of sub-blocks in sub-block scan order in greater detail. For example, with respect to FIG. 12A, according to aspects of this disclosure, a video coder (such as video encoder 20 or video decoder 30) may divide block 234 into sub-blocks 236A, 236B, 236C, and 236D (collectively, sub-blocks 236) while coding block 234. That is, video encoder 20 may divide block 234 into sub-blocks 236 when serializing transform coefficients of block 234. Alternatively, video decoder 30 may reconstruct transform coefficients of block 234 using sub-blocks 236.

The example shown in FIG. 12A generally illustrates a reverse horizontal coefficient scan order for scanning transform coefficients of block 234, while FIG. 12B generally illustrates a similarly oriented reverse vertical sub-block scan order for scanning sub-blocks 236. Accordingly, as shown in FIGS. 12A and 12B, a video coder may initially scan transform coefficients associated with a first sub-block 236A positioned in the lower right corner of block 234. The video coder may then scan transform coefficients associated with a second sub-block 236B positioned in the upper right corner of block 234, followed by a third sub-block 236C positioned in the lower left corner of block 234, and a fourth sub-block 236D positioned in the upper left corner of block 234.

Accordingly, the example shown in FIGS. 12A and 12B includes a scan orientation having a reverse horizontal orientation such that performing the scan on the block 234 comprises horizontally scanning transform coefficients of each of the plurality of sub-blocks 236 in the coefficient scan order from right to left and bottom to top within each of the plurality of sub-blocks 236 and horizontally scanning across each of the plurality of sub-blocks in the sub-block scan order from right to left and bottom to top of the block 234.

To facilitate the inverse scan shown in FIGS. 10A-12B, in some examples, the video coder may first identify the last significant coefficient of the respective block, as well as the last significant coefficient of each respective sub-block. That is, while the examples shown in FIGS. 10A-12B generally illustrate all transform coefficient positions being scanned, as described above, a video coder may only scan the significant coefficients. Accordingly, a video coder may determine a last significant coefficient in each of the sub-blocks, and scan each of the sub-blocks in coefficient scan order from the last significant coefficient of each sub-block to the relative first significant coefficient (e.g., a DC coefficient) of each sub-block. In addition, the video coder may determine the last significant coefficient of the block, and scan the sub-blocks in sub-block scan order from the last significant coefficient of the block to the relative first significant coefficient in the block (e.g., a DC coefficient). Accordingly, if one or more of the sub-blocks do not contain significant coefficients, such transform coefficients and/or sub-blocks may not be scanned.

Figure 13:
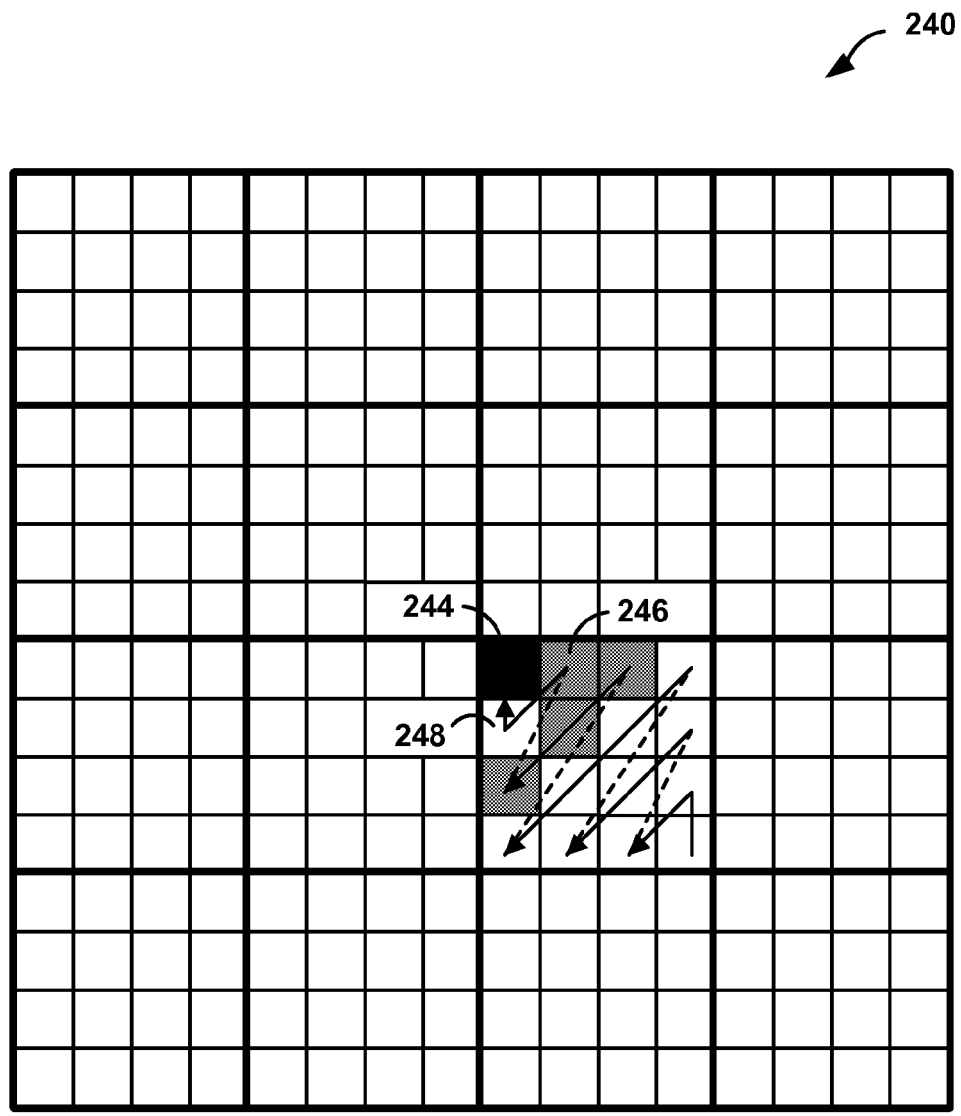
FIG. 13 is a conceptual diagram illustrating an example of context adaptive coding transform coefficients of a sub-block of video data.

FIG. 13 is a conceptual diagram illustrating an example of context adaptive coding transform coefficients of a sub-block of video data. For example, FIG. 13 illustrates a block of transform coefficients 240 that has been divided into a plurality of sub-blocks (4×4 sub-blocks, shown with a heavier border) and a diagonally oriented coefficient scan order within the sub-blocks passing through a transform coefficient position currently being coded 244 (solid block). The example shown in FIG. 13 includes a context support neighborhood 246 having four context support elements (shaded blocks). Relative to the context support neighborhood shown in FIG. 6, context support neighborhood 246 has a removed position 248. That is, for example, the context for coding a significance flag for the transform coefficient currently being coded 244 does not include data from removed position 248.

As noted above, each bin for a block of video data, whether corresponding to residual transform coefficient level or significance information for the block, may be coded using probability estimates for the bin that indicate a likelihood of the bin having a given value (e.g., "0" or "1"). The probability model is selected by determining a context for the bin, which may be identified by a context support neighborhood. That is, a context support neighborhood may identify the relative positions of previously coded syntax elements used to derive the context for entropy coding a particular symbol or flag associated with a transform coefficient. The context, e.g., the actual values of syntax elements located in the context neighborhood positions, determine the probability model.

In the example shown in FIG. 6, any of the transform coefficients along scan pattern line 171 may be coded in parallel, because no one position in scan line 171 includes a context support neighborhood that depends on another position in scan line 171 (assuming the same context support neighbourhood is used for all positions). Accordingly, scan line 171 allows contexts of a plurality of significance flags to be calculated in parallel, thereby enabling context pre-fetching for significance flag coding.

However, when a zig-zag or diagonal scan is applied to relatively large blocks (such as the one shown in FIG. 6) several coefficients may be fetched at the same time, thereby increasing the burden in a hardware implementation. That is, transform coefficients that are processed before and after a transform coefficient currently being coded along scan line 171 are not positioned in the same column or row as the transform coefficient currently being coded. Conventionally, transform coefficients are ordered and stored by column and row. Accordingly, in order to be able to retrieve contiguous data, more than one diagonal line of transform coefficients may need to be processed. In some instances, software based single instruction, multiple data (SIMD) implementations may face similar issues when parallelizing these large scans. Introducing the locality of sub-blocks may help to alleviate this problem. That is, the smaller sub-blocks may allow data to be retrieved in a more efficient way.

While dividing a block of transform coefficients into sub-blocks may help to alleviate the issue described above, the sub-blocks may also create a context dependency within the sub-blocks (e.g., when entropy coding using context). That is, a context support neighborhood for some positions in a sub-block may rely on other positions in the sub-block. As an example for purposes of illustration and shown in FIG. 13, when scanning within the sub-blocks using a zig-zag or forward diagonal coefficient scan order, the context support neighborhood for the first transform coefficient position (i.e., the position currently being coded 244 in the top left corner of the block) may typically include the position immediately below the position currently being coded 244 (e.g., using the five position context support neighborhood shown in FIG. 6). However, this dependency may impose an undesired delay when entropy coding. That is, the transform coefficient of the sub-block that is positioned immediately prior to the position currently being coded 244 may have to be coded in order to derive the context for the position currently being coded. To avoid this dependency and thus enhance parallelization, aspects of this disclosure relate to modifying the positions from which context is derived in sub-blocks, i.e., the context support neighborhood for positions within sub-blocks.

According to aspects of this disclosure, one or more positions may be removed from the context support neighborhood for certain positions within sub-blocks. That is, in the example shown in FIG. 13, a video coder may remove the removed position 248 from the context support neighborhood when coding current position 244, thereby providing a reduced context support neighborhood. Removed position 248 is positioned immediately before current position 244 in coefficient scan order. By not retrieving data associated with removed position 248 during coding, the dependency described above is eliminated. Accordingly, the video coder may code both the current position 244 and the removed position 248 in parallel (e.g., the context may be pre-fetched for more than one position in a sub-block). The context support neighborhood removal technique shown and described with respect to FIG. 13 may be expanded from two positions to three or more positions, depending on the number of transform coefficients that are scanned and coded in parallel. That is, for example, if three transform coefficients are coded in parallel, the video coder may remove the removed position 248, as well as the position immediately before the removed position in scan order (e.g., the position immediately to the right of current position 244).

In some examples, to perform the aspects of this disclosure, a video coder may derive the position in the scan order of a coefficient given the coefficient's block-based position. One process that may be used to determine the position follows (e.g., in C-code for the case of 8×8 sub-block and a diagonal scan):

```
UInt uiScanPosLast = 0;
UInt sWidth       = uiWidth >> 3;
UInt sX           = uiPosLastX >> 3;
UInt sY           = uiPosLastY >> 3;
UInt uiDs         = sX + sY;
if( uiDs < sWidth ) {
   uiScanPosLast += sX + (( uiDs * ( uiDs + 1 ) ) >> 1);
}
else {
   UInt uiDI     = ( (sWidth-1) << 1 ) - uiDs;
   uiScanPosLast += sWidth*(sWidth-1) - ( uiDI * ( uiDI + 1 ) >> 1 ) + sX
}
uiPosLastX    -= sX<<3;
uiPosLastY    -= sY<<3;
uiScanPosLast <<= 6;
UInt uiD      = uiPosLastY + uiPosLastX;
if( uiD < 8 ) {
   uiScanPosLast += uiPosLastX + (( uiD * ( uiD + 1 ) ) >> 1);
}
else {
   UInt uiDI    = 14 - uiD;
   uiScanPosLast += 56 - ( uiDI * ( uiDI + 1 ) >> 1 ) + uiPosLastX;
}
``` where uiPosLastX and uiPosLastX is the input for the X and Y location of a transform coefficient in the block, uiWidth is the width and height of the block (assuming, for purposes of example, that the block is square) and uiScanPosLast is the output that identifies the position of the coefficient in the sub-block scan order. After the position of the transform coefficient is known, the video coder may determine whether any context dependencies exist. If such context dependencies do exist, the video coder may remove one or more positions from the context support neighborhood, as described above.

According to aspects of this disclosure, some context support neighborhood positions may not be removed. For example, a DC position (e.g., in the upper left corner of block) may still use the context position that has been removed from the example shown in FIG. 13. The determination regarding whether to remove a position from the context support neighborhood may be based on a balancing of the coding efficiency gained by including all positions in the context support neighborhood (e.g., due to a more accurate estimation of the current position being a "1" or "0") and the latency introduced by including all of the positions. Moreover, as described with respect to FIG. 14 below, not all positions of the sub-blocks suffer from the same latency issue described with respect to FIG. 13.

Figure 14:
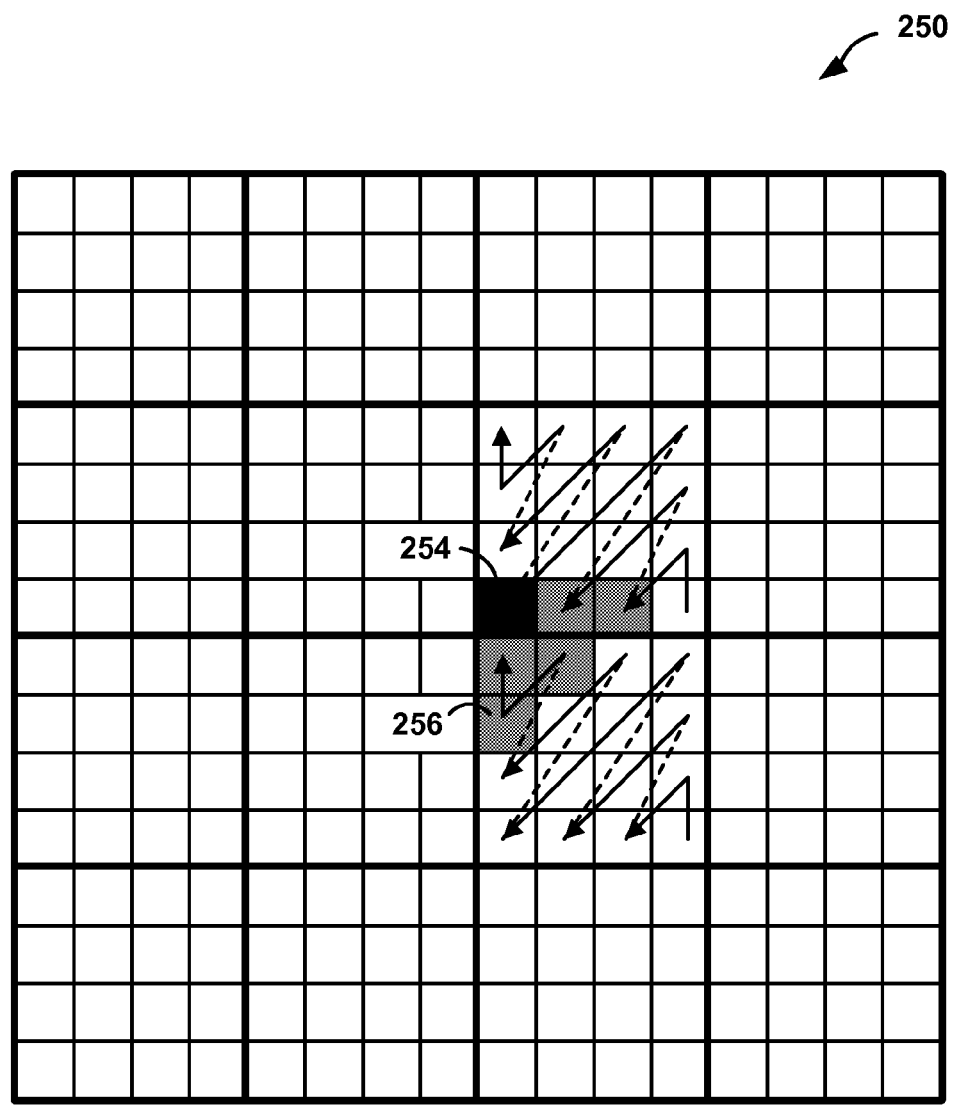
FIG. 14 is a conceptual diagram illustrating another example of context adaptive coding transform coefficients of a sub-block of video data.

FIG. 14 is a conceptual diagram illustrating another example of context adaptive coding transform coefficients of a sub-block of video data. For example, FIG. 14 illustrates a block of transform coefficients 250 that has been divided into a plurality of sub-blocks (4×4 sub-blocks, shown with a heavier border) and a diagonally oriented coefficient scan order within the sub-blocks passing through a transform coefficient position currently being coded 254 (solid black block). The example shown in FIG. 14 includes a context support neighborhood 256 having five context support elements (shaded blocks). That is, the context support neighborhood in FIG. 14 includes all five positions.

The context support neighborhood 254 shown in FIG. 14 may include all five context support neighborhood positions, because the context dependency issue described with respect to FIG. 13 is no longer present. For example, the position that is scanned and coded immediately prior to current position 254 is not included in context support neighborhood 256. Accordingly, the context dependency issue and associated close loop latency described above is not present.

Thus, in some examples as noted above, the video coder may determine the position of the transform coefficient currently being coded prior to removing positions from the context support neighborhood.

Figure 15:
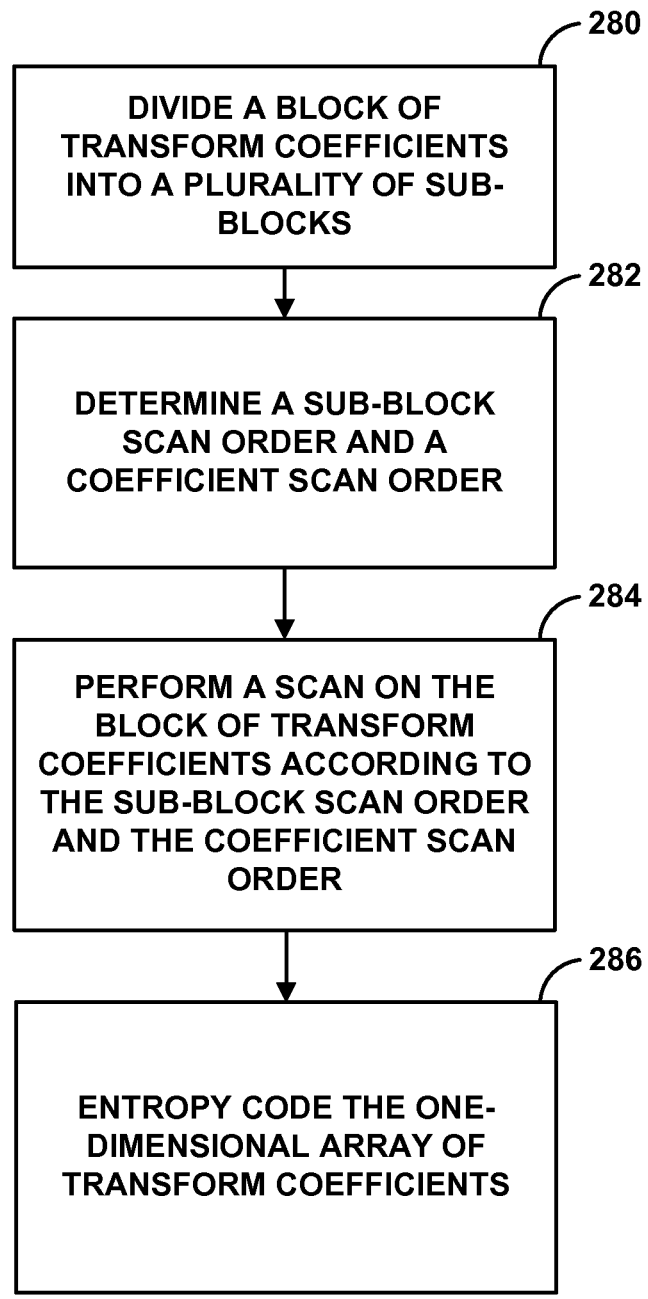
FIG. 15 is a flowchart illustrating an example video encoding process according to the techniques of this disclosure.

FIG. 15 is a flowchart illustrating an example video encoding process for encoding transform coefficients. This method may be performed by video encoder 20 of FIGS. 1 and 2. While described with respect to video encoder 20, it should be understood that the techniques described with respect to FIG. 15 may be performed by a variety of other processors, processing units, hardware-based coding units such as encoder/decoders (CODECs), and the like.

Video encoder 20 may divide a block of transform coefficients into a plurality of sub-blocks (280). In some examples, the sub-blocks may be 4×4 transform coefficients in size. In other examples, video encoder 20 may form larger or smaller sub-blocks. That is, in other examples, the size of the sub-blocks may be 2×2, 8×8, 16×16, or n×n, as long as the sub-block size is smaller than or equal to the original block size. Video encoder 20 may determine the way in which the block is divided based on the size of the block. In this example, a video decoder (such as video decoder 30) may infer how to sub-divide the block based on its size. In other examples, video encoder 20 may indicate the number and/or size of the sub-blocks in an encoded bitstream (e.g., in a header, parameter set, or the like).

Video encoder 20 may also determine a sub-block scan order for the plurality of sub-blocks and a coefficient scan order for transform coefficients within each of the plurality of sub-blocks (282). In general, the sub-block scan order may be the order in which each of the plurality of sub-blocks is scanned. The coefficient scan order may be the order in which the transform coefficients within each of the plurality of sub-blocks are scanned. The sub-block scan order and the coefficient scan order may include both a scan pattern and a scan direction (e.g., a diagonal scan pattern having a particular direction). For example, the sub-block scan order may be one of a forward zig-zag scan, a forward horizontal scan, a forward vertical scan, a forward diagonal scan, an inverse zig-zag scan, an inverse horizontal scan, an inverse vertical scan, and an inverse diagonal scan. Likewise, the coefficient scan order may be one of a forward zig-zag scan, a forward horizontal scan, a forward vertical scan, a forward diagonal scan, an inverse zig-zag scan, an inverse horizontal scan, an inverse vertical scan, and an inverse diagonal scan.

According to aspects of this disclosure, video encoder 20 may determine a sub-block scan order that matches the coefficient scan orders used to scan transform coefficients within each of the sub-blocks. That is, video encoder 20 may use a coefficient scan order for scanning coefficients within each of the sub-blocks that is the same as the sub-block scan orders for scanning the sub-blocks themselves. In an example for purposes of illustration, as described with respect to FIGS. 10A and 10B, video encoder 20 may determine a reverse diagonal orientation for the sub-block scan order and the coefficient scan order. In this example, the scan traverses the sub-blocks in the coefficient scan order from a lower-right corner of a sub-block to an upper-left corner of the sub-blocks, and diagonally scans across each of the sub-blocks in the sub-block scan order from an lower-right sub-block of the block to a upper-left sub-block of the block.

According to other aspects of this disclosure, video encoder 20 may adaptively determine the coefficient scan order and/or the sub-block scan order. That is, video encoder 20 may select the sub-block scan order and/or the coefficient scan order for a block based on block size, intra/inter prediction mode, neighboring block's information (prediction mode, motion information, scan index), or other video coding characteristics. In another example, video encoder 20 may determine the sub-block scan order and the coefficient scan order based on a rate-distortion analysis. In this case, video encoder 20 may include syntax (e.g., a block scan index, such as that shown in Table 1 above) in an encoded bitstream indicating the sub-block scan order and the coefficient scan order for use at a decoder.

Video encoder 20 may also perform a scan on the block of transform coefficients according to the sub-block scan order and the coefficient scan order to produce a one-dimensional array of transform coefficients (284). Video encoder 20 may also code the one-dimensional array of transform coefficients (286). In some examples, the scanning and coding of transform coefficients may be interleaved. That is, transform coefficients may be coded as they are scanned (e.g., rather than scanning all transform coefficients of a block prior to coding).

It should be understood that the steps shown and described with respect to FIG. 15 are provided as merely one example. That is, the steps of the method of FIG. 15 need not necessarily be performed in the order shown in FIG. 15, and fewer, additional, or alternative steps may be performed.

Figure 16:
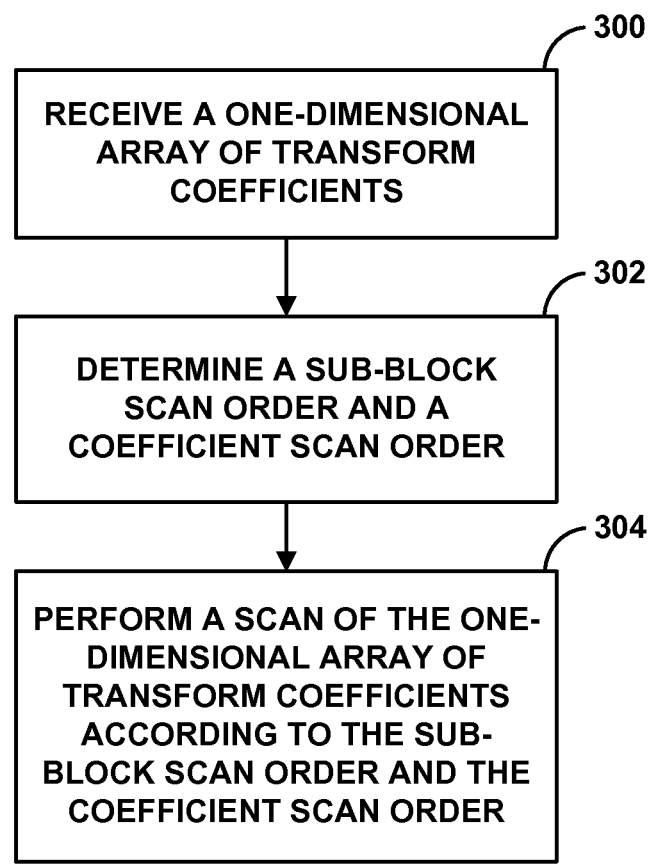
FIG. 16 is a flowchart illustrating an example video decoding process according to the techniques of this disclosure.

FIG. 16 is a flowchart illustrating an example video decoding process. The method of FIG. 16 may, in some examples, be performed by video decoder 30 of FIGS. 1 and 3. While described with respect to video decoder 30, it should be understood that the techniques described with respect to FIG. 16 may be performed by a variety of other processors, processing units, hardware-based coding units such as encoder/decoders (CODECs), and the like.

Video decoder 30 may receive a one-dimensional array of transform coefficients (300). According to some examples, the array of transform coefficients may be coded according to a plurality of sub-blocks. For example, the sub-blocks may be 4×4 transform coefficients in size. In other examples, the sub-blocks may be 2×2, 8×8, 16×16, or n×n, as long as the sub-block size is smaller than or equal to the original block size. In some examples, video decoder 30 may infer the size of the sub-blocks based on size of the received block (e.g., based on received syntax indicating the size of the block). In other examples, video decoder 30 may receive an indication regarding the number and/or size of the sub-blocks in an encoded bitstream (e.g., in a header, parameter set, or the like).

In any case, video decoder 30 may determine a sub-block scan order for the plurality of sub-blocks and a coefficient scan order for transform coefficients within each of a plurality of sub-blocks (302). The sub-block scan order and the coefficient scan order may include both a scan pattern and a scan direction (e.g., a diagonal scan pattern having a particular direction). For example, the sub-block scan order may be one of a forward zig-zag scan, a forward horizontal scan, a forward vertical scan, a forward diagonal scan, an inverse zig-zag scan, an inverse horizontal scan, an inverse vertical scan, and an inverse diagonal scan. Likewise, the coefficient scan order may be one of a forward zig-zag scan, a forward horizontal scan, a forward vertical scan, a forward diagonal scan, an inverse zig-zag scan, an inverse horizontal scan, an inverse vertical scan, and an inverse diagonal scan.

According to aspects of this disclosure, video decoder 30 may determine a sub-block scan order that matches the coefficient scan orders used to scan transform coefficients within each of the sub-blocks. That is, video decoder 30 may use a coefficient scan order for scanning coefficients within each of the sub-blocks that is the same as the sub-block scan orders for scanning the sub-blocks themselves, e.g., in pattern and direction. In an example for purposes of illustration, as described with respect to FIGS. 10A and 10B, video decoder 30 may determine a reverse diagonal orientation for the sub-block scan order and the coefficient scan order. In this example, the scan traverses the sub-blocks in the coefficient scan order from a lower-right corner of a sub-block to an upper-left corner of the sub-blocks, and diagonally scans across each of the sub-blocks in the sub-block scan order from an lower-right sub-block of the block to a upper-left sub-block of the block.

According to other aspects of this disclosure, video decoder 30 may adaptively determine the coefficient scan order and/or the sub-block scan order. That is, video decoder 30 may select the sub-block scan order and/or the coefficient scan order for a block based on block size, intra/inter prediction mode, neighboring block's information (prediction mode, motion information, scan index), or other video coding characteristics. In another example, video decoder 30 may receive one or more syntax elements in an encoded bitstream indicating the sub-block scan order and the coefficient scan order.

Video decoder 30 may also perform a scan on the one-dimensional array of transform coefficients according to the sub-block scan order and the coefficient scan order to produce a block of transform coefficients (304). That is, video decoder may scan received transform coefficients in coefficient scan order to reconstruct the sub-blocks and the sub-blocks themselves in sub-block scan order to reconstruct a two-dimensional block of transform coefficients coded by a video encoder. Then, video decoder 30 may inverse quantize and apply an inverse transform to the two-dimensional block of transform coefficients to generate residual values. Video decoder may then add the residual values to predictive values to reconstruct the pixels of the coded block.

It should be understood that the steps shown and described with respect to FIG. 16 are provided as merely one example. That is, the steps of the method of FIG. 16 need not necessarily be performed in the order shown in FIG. 16, and fewer, additional, or alternative steps may be performed.

Figure 17:
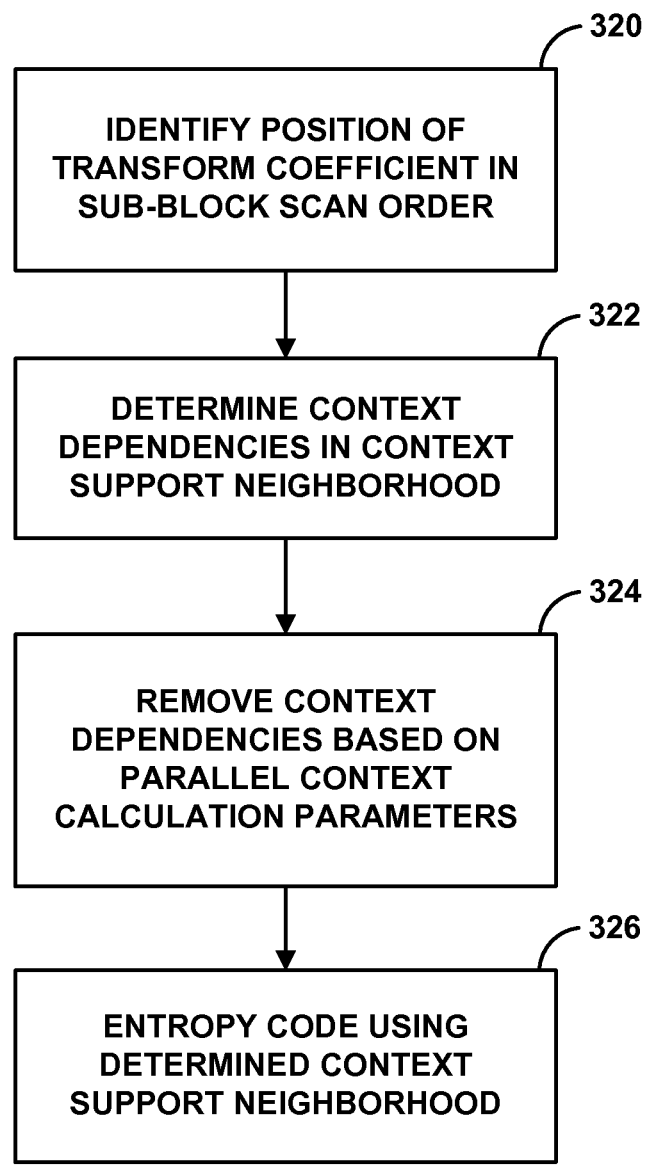
FIG. 17 is a flowchart illustrating an example method for context adaptive coding transform coefficients of a sub-block of video data.

FIG. 17 illustrates an example method for context adaptive coding transform coefficients of a sub-block of video data. In the example shown in FIG. 17 a video coder (such as video encoder 20 or video decoder 30) may initially determine a position of a transform coefficient currently being coded in the sub-block scan order (320). That is, the video coder may determine the relative position of the transform coefficient currently being coded, as well as the particular orientation of the scan being used to scan the transform coefficient.

Based on the position and the orientation of the scan order, the video coder may determine whether any context dependencies exist in a context support neighborhood for context coding the transform coefficient currently being coded (322). For example, as described above with respect to FIGS. 11 and 12 above, in some instances, a context support neighborhood for a transform coefficient position in a sub-block may rely on a position coded immediately before the transform coefficient currently being coded.

According to aspects of this disclosure, the video coder may remove context dependencies based on parallel context calculation parameters (e.g., a number of transform coefficients that are being coded in parallel) (324). That is, as shown in the example of FIG. 13 above, the video coder may remove the position immediately before the transform coefficient currently being coded from the context support neighborhood in instances in which two transform coefficients are coded in parallel. In other examples, three or more positions may be removed from the context support neighborhood. The video coder may then entropy code the transform coefficient currently being coded using the determined context support neighborhood (with removed context dependencies) (326).

It should be understood that the steps shown and described with respect to FIG. 17 are provided as merely one example. That is, the steps of the method of FIG. 17 need not necessarily be performed in the order shown in FIG. 17, and fewer, additional, or alternative steps may be performed.

Moreover, it should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

In one or more examples, the functions described in this disclosure may be implemented in hardware, software, firmware, or any combination thereof. If implemented in software, the functions may be performed by a hardware-based processing unit, such as one or more processors, that execute the software in the form of computer-readable instructions or code. Such instructions or code may be stored on or transmitted over a computer-readable medium and executed by a hardware-based processing unit. Computer-readable media may include computer-readable storage media, which corresponds to a tangible, non-transitory medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, Flash memory, CD-ROM or any other solid state, optical or magnetic data storage media, including optical disk storage, magnetic disk storage, or other magnetic storage devices, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that tangible computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be performed by a wide variety of devices or apparatuses, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. In addition, such techniques may be implemented by an integrated circuit (IC) or a set of ICs (e.g., a chip set). A device configured to perform the techniques of the this disclosure may include any of the devices mentioned above and, in some cases, may be a video encoder or video decoder, or combined video encoder-decoder, i.e., a video CODEC, which may be formed by a combination of hardware, software, and firmware. Various components, modules, or units may be described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding transform coefficients in a video decoding process comprising:
   obtaining, from an encoded bitstream, a one-dimensional array of transform coefficients associated with a block of transform coefficients;
   determining a plurality of sub-blocks of transform coefficients for the block of transform coefficients, each sub-block of the plurality of sub-blocks having an equal size;
   decoding, from an encoded bitstream, data that represents a unified scan order for scanning a set of information of the block, wherein the set of information comprises significance information of the transform coefficients of respective sub-blocks, coefficient level information of the transform coefficients of respective sub-blocks, and the plurality of sub-blocks;
   determining, based on the data that represents the unified scan order for the set of information, a unified diagonal scan for scanning the significance information of the transform coefficients of respective sub-blocks, the coefficient level information of the transform coefficients of respective sub-blocks, and the plurality of sub-blocks;
   scanning the one-dimensional array of transform coefficients according to the unified diagonal scan, wherein the scanning comprises scanning the significance information of the transform coefficients and the coefficient level information of the transform coefficients for each sub-block of the plurality of sub-blocks using the unified diagonal scan and scanning the plurality of sub-blocks using the unified diagonal scan to produce the block of transform coefficients; and
   decoding the block of transform coefficients.

2. The method of claim 1, wherein the unified diagonal scan comprises a reverse diagonal orientation such that scanning comprises reverse diagonally scanning transform coefficients of each of the plurality of sub-blocks from a lower-right corner to an upper-left corner of each of the plurality of sub-blocks and diagonally scanning across each of the plurality of sub-blocks from a lower-right sub-block of the block to a upper-left sub-block of the block.

3. The method of claim 1, wherein the unified diagonal scan comprises a forward diagonal orientation such that scanning comprises forward diagonally scanning transform coefficients of each of the plurality of sub-blocks from an upper-left corner to a lower-right corner of each of the plurality of sub-blocks and diagonally scanning across each of the plurality of sub-blocks from an upper-left sub-block to a lower-right sub-block of the block.

4. The method of claim 1, wherein scanning comprises beginning the scanning in a sub-block of the plurality of sub-blocks that contains a last significant coefficient of the array of transform coefficients.

5. The method of claim 1, wherein scanning comprises beginning the scanning in each of the plurality of sub-blocks from a last significant coefficient in the unified diagonal scan.

6. The method of claim 1, wherein scanning comprises scanning all bins associated with transform coefficients of a current sub-block of the plurality of sub-blocks before scanning bins associated with transform coefficients of a next sub-block of the plurality of sub-blocks.

7. The method of claim 1, wherein scanning comprises scanning the significance information prior to scanning the transform coefficient level information.

8. The method of claim 1, wherein determining the unified diagonal scan comprises selecting the unified diagonal scan based on one of a rate-distortion metric, a block size, a prediction mode, and information associated with a neighboring block.

9. The method of claim 1, wherein decoding the one-dimensional array of transform coefficients comprises context adaptive binary arithmetic decoding the one-dimensional array of transform coefficients.

10. The method of claim 9, further comprising:
    determining a context for decoding the significance information associated with the transform coefficients in parallel, wherein the context varies based on a position of a transform coefficient currently being decoded in the block.

11. An apparatus for decoding transform coefficients in a video decoding process, the apparatus comprising:
    a memory configured to store a one-dimensional array of transform coefficients associated with a block of transform coefficients; and one or more processors configured to:
obtain, from an encoded bitstream, the one-dimensional array of transform coefficients;
determine a plurality of sub-blocks of transform coefficients for the block of transform coefficients, each sub-block of the plurality of sub-blocks having an equal size;
decode, from an encoded bitstream, data that represents a unified scan order for scanning a set of information of the block, wherein the set of information comprises significance information of the transform coefficients of respective sub-blocks, coefficient level information of the transform coefficients of respective sub-blocks, and the plurality of sub-blocks;
determine, based on the data that represents the unified scan order for the set of information, a unified diagonal scan for scanning the significance information of the transform coefficients of respective sub-blocks, the coefficient level information of the transform coefficients of respective sub-blocks, and the plurality of sub-blocks;
scan on the one-dimensional array of transform coefficients according to the unified diagonal scan, the scan comprising scanning the significance information of the transform coefficients and the coefficient level information of the transform coefficients for each sub-block of the plurality of sub-blocks using the unified diagonal scan and scanning the plurality of sub-blocks using the unified diagonal scan to produce the block of transform coefficients; and
decode the block of transform coefficients.

12. The apparatus of claim 11, wherein the unified diagonal scan comprises a reverse diagonal orientation such that scanning comprises reverse diagonally scanning transform coefficients of each of the plurality of sub-blocks from a lower-right corner to an upper-left corner of each of the plurality of sub-blocks and diagonally scanning across each of the plurality of sub-blocks from a lower-right sub-block of the block to a upper-left sub-block of the block.

13. The apparatus of claim 11, wherein the unified diagonal scan comprises a forward diagonal orientation such that scanning comprises forward diagonally scanning transform coefficients of each of the plurality of sub-blocks from an upper-left corner to a lower-right corner of each of the plurality of sub-blocks and diagonally scanning across each of the plurality of sub-blocks from an upper-left sub-block to a lower-right sub-block of the block.

14. The apparatus of claim 11, wherein to scan, the one or more processors are configured to begin the scan in a sub-block of the plurality of sub-blocks that contains a last significant coefficient of the array of transform coefficients.

15. The apparatus of claim 11, wherein to scan, the one or more processors are configured to begin the scan in each of the plurality of sub-blocks from a last significant coefficient in the unified diagonal scan.

16. The apparatus of claim 11, wherein to scan, the one or more processors are configured to scan all bins associated with transform coefficients of a current sub-block of the plurality of sub-blocks before scanning bins associated with transform coefficients of a next sub-block of the plurality of sub-blocks.

17. The apparatus of claim 11, wherein to scan, the one or more processors are configured to scan significance bins for the block prior to scanning transform coefficient level bins for the block.

18. The apparatus of claim 11, wherein to determine the unified diagonal scan, the one or more processors are configured to select the unified diagonal scan based on one of a rate-distortion metric, a block size, a prediction mode, and information associated with a neighboring block.

19. The apparatus of claim 11, wherein to decode the one-dimensional array of transform coefficients, the one or more processors are configured to context adaptive binary arithmetic decode the one-dimensional array of transform coefficients.

20. The apparatus of claim 19, wherein the one or more processors are further configured to:
determine a context for decoding the significance information associated with the transform coefficients in parallel, wherein the context varies based on a position of a transform coefficient currently being decoded in the block.

21. An apparatus for decoding transform coefficients in a video decoding process, the apparatus comprising:
means for obtaining, from an encoded bitstream, a one-dimensional array of transform coefficients associated with a block of transform coefficients;
means for determining a plurality of sub-blocks of transform coefficients for the block of transform coefficients, each sub-block of the plurality of sub-blocks having an equal size;
means for decoding, from an encoded bitstream, data that represents a unified scan order for scanning a set of information of the block, wherein the set of information comprises significance information of the transform coefficients of respective sub-blocks, coefficient level information of the transform coefficients of respective sub-blocks, and the plurality of sub-blocks:
means for determining, based on the data that represents the unified scan order for the set of information, a unified diagonal scan for scanning the significance information of the transform coefficients of respective sub-blocks, the coefficient level information of the transform coefficients of respective sub-blocks, and the plurality of sub-blocks;
means for scanning the one-dimensional array of transform coefficients according to the unified diagonal scan, wherein the means for scanning comprises means for scanning the significance information of the transform coefficients and the coefficient level information of the transform coefficients for each sub-block of the plurality of sub-blocks using the unified diagonal scan and means for scanning the plurality of sub-blocks using the unified diagonal scan to produce the block of transform coefficients; and
means for decoding the block of transform coefficients.

22. The apparatus of claim 21, wherein means for decoding comprises means for context adaptive binary arithmetic decoding the one-dimensional array of transform coefficients.

23. The apparatus of claim 22, further comprising:
means for determining a context for decoding the significance information associated with the transform coefficients in parallel, wherein the context varies based on a position of a transform coefficient currently being decoded in the block.

24. A non-transitory computer-readable storage medium having instructions stored thereon that, when executed, cause one or more processors to:
obtain, from an encoded bitstream, a one-dimensional array of transform coefficients associated with a block of transform coefficients;

determine a plurality of sub-blocks of transform coefficients for the block of transform coefficients, each sub-block of the plurality of sub-blocks having an equal size;

decode, from an encoded bitstream, data that represents a unified scan order for scanning a set of information of the block, wherein the set of information comprises significance information of the transform coefficients of respective sub-blocks, coefficient level information of the transform coefficients of respective sub-blocks, and the plurality of sub-blocks determine, based on the data that represents the unified scan order for the set of information, a unified diagonal scan for scanning the significance information of the transform coefficients of respective sub-blocks, the coefficient level information of the transform coefficients of respective sub-blocks, and the plurality of sub-blocks;

scan on the one-dimensional array of transform coefficients according to the unified diagonal scan, the scan comprising scanning the significance information of the transform coefficients and the coefficient level information of the transform coefficients for each sub-block of the plurality of sub-blocks using the unified diagonal scan and scanning the plurality of sub-blocks using the unified diagonal scan to produce the block of transform coefficients; and decode the block of transform coefficients.

25. The non-transitory computer-readable storage medium of claim 24, wherein the instructions further cause the one or more processors to context adaptive binary arithmetic decode the one-dimensional array of transform coefficients.

26. The non-transitory computer-readable storage medium of claim 25, further comprising:
  instructions that cause the one or more processors to determine a context for decoding the significance information associated with the transform coefficients in parallel, wherein the context varies based on a position of a transform coefficient currently being decoded in the block.

27. A method for encoding transform coefficients in a video encoding process comprising:
  dividing a block of transform coefficients into a plurality of sub-blocks, each sub-block of the plurality of sub-blocks having an equal size;
  determining, for the block of transform coefficients, a unified diagonal scan for scanning a set of information for the block, wherein the set of information comprises significance information of the transform coefficients of respective sub-blocks, coefficient level information of the transform coefficients of respective sub-blocks, and the plurality of sub-blocks;
  scanning the block of transform coefficients according to the unified diagonal scan, wherein the scanning comprises scanning the significance information of the transform coefficients and the coefficient level information of the transform coefficients for each sub-block of the plurality of sub-blocks using the unified diagonal scan and scanning the plurality of sub-blocks using the unified diagonal scan to produce a one-dimensional array of transform coefficients; and
  encoding the transform coefficients and the data that represents the unified diagonal scan order.

28. The method of claim 27, wherein the unified diagonal scan comprises a reverse diagonal orientation such that scanning comprises reverse diagonally scanning transform coefficients of each of the plurality of sub-blocks from a lower-right corner to an upper-left corner of each of the plurality of sub-blocks and diagonally scanning across each of the plurality of sub-blocks from a lower-right sub-block of the block to a upper-left sub-block of the block.

29. The method of claim 27, wherein the unified diagonal scan comprises a forward diagonal orientation such that scanning comprises forward diagonally scanning transform coefficients of each of the plurality of sub-blocks from an upper-left corner to a lower-right corner of each of the plurality of sub-blocks and diagonally scanning across each of the plurality of sub-blocks from an upper-left sub-block to a lower-right sub-block of the block.

30. The method of claim 27, wherein scanning comprises beginning the scanning in a sub-block of the plurality of sub-blocks that contains a last significant coefficient of the array of transform coefficients.

31. The method of claim 27, wherein scanning comprises beginning the scanning in each of the plurality of sub-blocks from a last significant coefficient in the unified diagonal scan.

32. The method of claim 27, wherein scanning comprises scanning all bins associated with transform coefficients of a current sub-block of the plurality of sub-blocks before scanning bins associated with transform coefficients of a next sub-block of the plurality of sub-blocks.

33. The method of claim 27, wherein scanning comprises scanning the significance information prior to scanning the transform coefficient level information.

34. The method of claim 27, wherein determining the unified diagonal scan comprises selecting the unified diagonal scan based on one of a rate-distortion metric, a block size, a prediction mode, and information associated with a neighboring block.

35. The method of claim 27, wherein encoding comprises context adaptive binary arithmetic encoding.

36. The method of claim 35, further comprising:
  determining a context for encoding the significance information associated with the transform coefficients in parallel, wherein the context varies based on a position of a transform coefficient currently being encoded in the block.

37. An apparatus for encoding transform coefficients in an encoding process, the apparatus comprising:
  a memory configured to store a block of transform coefficients; and
  one or more processors configured to:
    divide the block of transform coefficients into a plurality of sub-blocks, each sub-block of the plurality of sub-blocks having an equal size;
    determine, for the block of transform coefficients, a unified diagonal scan for scanning a set of information for the block, wherein the set of information comprises significance information of the transform coefficients of respective sub-blocks, coefficient level information of the transform coefficients of respective sub-blocks, and the plurality of sub-blocks;
    scan the block of transform coefficients according to the unified diagonal scan, wherein to scan the block the one or more processors are configured to scan the significance information of the transform coefficients and the coefficient level information of the transform coefficients for each sub-block of the plurality of sub-blocks using the unified diagonal scan and scan the plurality of sub-blocks using the unified diagonal scan to produce a one-dimensional array of transform coefficients; and encode the transform coefficients and the data that represents the unified diagonal scan order.

38. The apparatus of claim 37, wherein the unified diagonal scan comprises a reverse diagonal orientation such that scanning comprises reverse diagonally scanning transform coefficients of each of the plurality of sub-blocks from a lower-right corner to an upper-left corner of each of the plurality of sub-blocks and diagonally scanning across each of the plurality of sub-blocks from a lower-right sub-block of the block to a upper-left sub-block of the block.

39. The apparatus of claim 37, wherein the unified diagonal scan comprises a forward diagonal orientation such that scanning comprises forward diagonally scanning transform coefficients of each of the plurality of sub-blocks from an upper-left corner to a lower-right corner of each of the plurality of sub-blocks and diagonally scanning across each of the plurality of sub-blocks from an upper-left sub-block to a lower-right sub-block of the block.

40. The apparatus of claim 37, wherein to scan, the one or more processors are configured to begin the scan in a sub-block of the plurality of sub-blocks that contains a last significant coefficient of the array of transform coefficients.

41. The apparatus of claim 37, wherein to scan, the one or more processors are configured to begin the scan in each of the plurality of sub-blocks from a last significant coefficient in the unified diagonal scan.

42. The apparatus of claim 37, wherein to scan, the one or more processors are configured to scan all bins associated with transform coefficients of a current sub-block of the plurality of sub-blocks before scanning bins associated with transform coefficients of a next sub-block of the plurality of sub-blocks.

43. The apparatus of claim 37, wherein to scan, the one or more processors are configured to scan the significance information prior to scanning the transform coefficient level information.

44. The apparatus of claim 43, wherein to determine the unified diagonal scan, the one or more processors are configured to select the unified diagonal scan based on one of a rate-distortion metric, a block size, a prediction mode, and information associated with a neighboring block.

45. The apparatus of claim 37, wherein to encode, the one or more processors are configured to context adaptive binary arithmetic encode the one-dimensional array of transform coefficients.

46. The apparatus of claim 45, wherein the one or more processors are further configured to:

determine a context for encoding the significance information associated with the transform coefficients in parallel, wherein the context varies based on a position of a transform coefficient currently being encoded in the block.

47. An apparatus for encoding transform coefficients in a video encoding process, the apparatus comprising:

means for dividing a block of transform coefficients into a plurality of sub-blocks, each sub-block of the plurality of sub-blocks having an equal size;

means for determining, for the block of transform coefficients, a unified diagonal scan for scanning a set of information for the block, wherein the set of information comprises significance information of the transform coefficients of respective sub-blocks, coefficient level information of the transform coefficients of respective sub-blocks, and the plurality of sub-blocks;

means for scanning on the block of transform coefficients according to the unified diagonal scan, wherein the means for scanning comprises means for scanning the significance information of the transform coefficients and the coefficient level information of the transform coefficients for each sub-block of the plurality of sub-blocks using the unified diagonal scan and means for scanning the plurality of sub-blocks using the unified diagonal scan; and means for encoding the transform coefficients and the data that represents the unified diagonal scan order.

48. The apparatus of claim 47, wherein means for encoding comprises means for context adaptive binary arithmetic encoding the one-dimensional array of transform coefficients.

49. The apparatus of claim 48, further comprising:

means for determining a context for encoding the significance information associated with the transform coefficients in parallel, wherein the context varies based on a position of a transform coefficient currently being encoded in the block.

50. A non-transitory computer-readable storage medium having instructions stored thereon that, when executed, cause one or more processors to:

divide a block of transform coefficients into a plurality of sub-blocks, each sub-block of the plurality of sub-blocks having an equal size;

determine, for the block of transform coefficients, a unified diagonal scan for scanning a set of information for the block, wherein the set of information comprises significance information of the transform coefficients of respective sub-blocks, coefficient level information of the transform coefficients of respective sub-blocks, and the plurality of sub-blocks;

scan perform a scan on the block of transform coefficients according to the unified diagonal scan, the scanning comprising scanning the significance information of the transform coefficients and the coefficient level information of the transform coefficients for each sub-block of the plurality of sub-blocks using the unified diagonal scan and scanning the plurality of sub-blocks using the unified diagonal scan to produce a one-dimensional array of transform coefficients; and encode the transform coefficients and the data that represents the unified diagonal scan order.

51. The apparatus of claim 11, wherein the one or more processors are configured to:

decode a block of video data based on the block of transform coefficients, wherein the apparatus further comprises a display configured to display the block.

52. The apparatus of claim 37, further comprising a camera configured to capture a picture comprising a block of video data, wherein the one or more processors is configured to generate the block of transform coefficients based on the block of video data.

53. The method of claim 1, wherein the block of transform coefficients is 8 transform coefficients by 8 transform coefficients or greater in size, and wherein determining the plurality of sub-blocks of transform coefficients comprises determining sub-blocks that are 4 transform coefficients by 4 transform coefficients in size.

54. The method of claim 1, wherein the block of transform coefficients is 8 transform coefficients by 8 transform coefficients or greater in size, and wherein determining the plurality of sub-blocks of transform coefficients having the equal size comprises determining sub-blocks having a fixed size regardless of the size of the block of transform coefficients.

* * * * *